United States Patent [19]

Roeder

[11] Patent Number: 4,653,069
[45] Date of Patent: Mar. 24, 1987

[54] SPREAD SPECTRUM CORRELATION RECEIVER

[75] Inventor: Allan W. Roeder, Whitesboro, N.Y.

[73] Assignee: General Electric Company, Syracuse, N.Y.

[21] Appl. No.: 629,248

[22] Filed: Nov. 6, 1975

[51] Int. Cl.[4] .............................................. H04K 1/10
[52] U.S. Cl. ......................................... 380/31; 375/1; 380/34
[58] Field of Search .................... 325/30, 42, 65, 320, 325/321, 323, 324, 473, 474, 476; 375/1, 2.1, 2.2

[56] References Cited

U.S. PATENT DOCUMENTS 2,982,853  5/1961  Price et al. ............................ 325/65

Primary Examiner—Salvatore Cangialosi
Attorney, Agent, or Firm—Carl W. Baker; Richard V. Lang

[57] ABSTRACT

A spread spectrum communication system having a correlation receiver for decoding an information signal transmitted on a pseudo-noise (PN) carrier. The receiver synchronizes to the transmitted signal by performing a continuous sequence of correlations until a correlation output exceeding a predetermined threshold level is detected. Thereafter, the receiver performs a plurality of correlations during a sampling interval which is timed to occur at approximately the time when high subsequent correlation output signals are likely to appear. After enhancement through adaptive filter processing, the correlation outputs generated during each sampling interval are accumulated (integrated and the summed output present at the end of the sampling interval is representative of the transmitted data message (a binary bit). The adaptive filter develops and stores weighting values representing the expected signal strength of the correlation outputs and the actual correlation outputs are multiplied by the weighting values. Received signal energy representing atmospheric and specular multipath signal components are detected and channeled to the accumulator along with the main signal component. The accumulator thus realigns the multipath signals with the main signal, resulting in a significant increase in processing gain. An audio version of the system is also disclosed.

8 Claims, 22 Drawing Figures

LOAD R7 FIRST    LOAD R6 FIRST    LOAD R5 FIRST
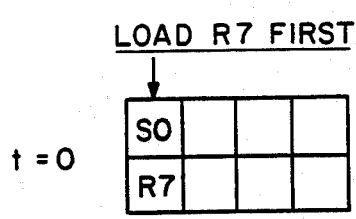 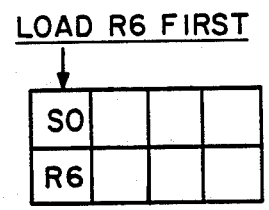 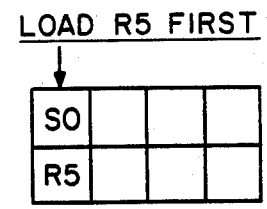
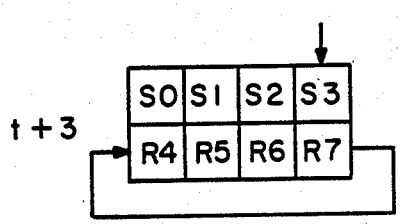 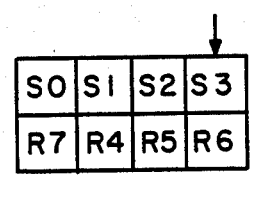 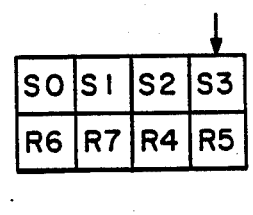
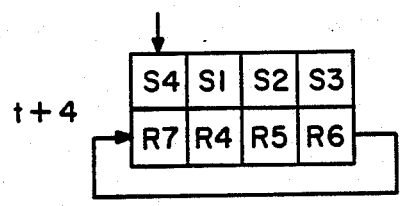 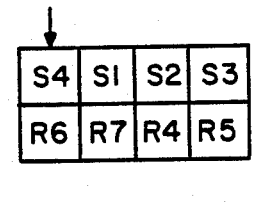 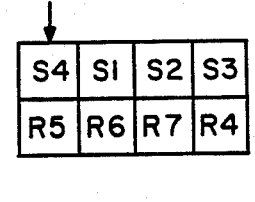
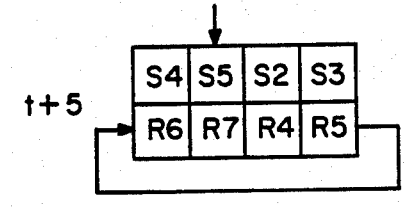 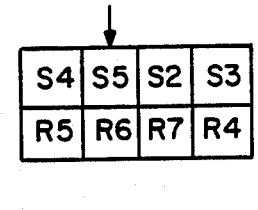 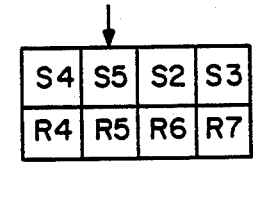
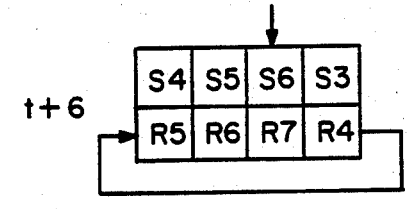 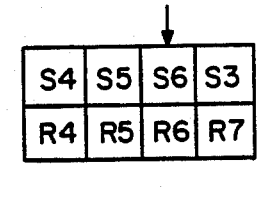 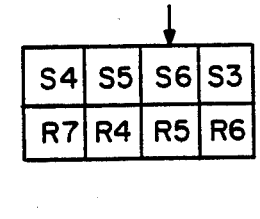
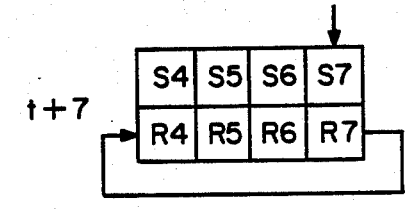 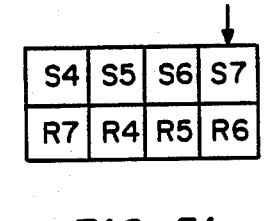 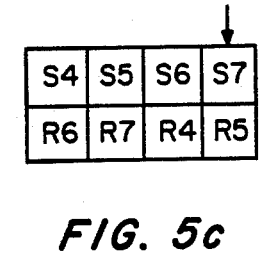
FIG. 5a    FIG. 5b    FIG. 5c
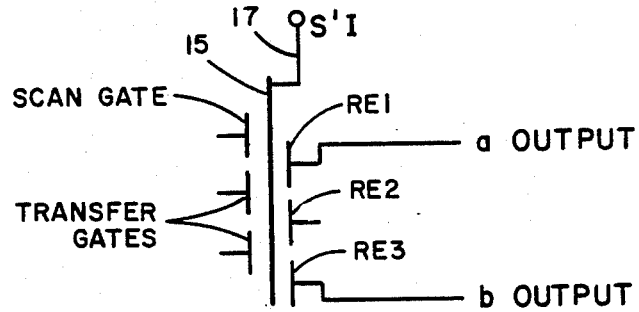
FIG. 6

SPREAD SPECTRUM CORRELATION RECEIVER

BACKGROUND OF THE INVENTION

This invention relates to spread spectrum communication systems and, more particularly, to a receiver for such a system which employs correlation detection means.

Spread spectrum communication systems are useful in environments where a high degree of interference may be experienced. One type of wideband or spread spectrum signal processing technique which is frequently used is the so-called pseudo-random noise or pseudo-noise (PN) system. In such a system the baseband carrier is a coded signal utilizing a long string of 1 and 0 data cells which occur in a predictable sequence but which have properties similar to random numbers. To a listener not knowing the code, the cells appear to occur in a random sequence. If the PN code has N cells (bits), the rf 3 db bandwidth of the transmitted signal is approximately N times the information bandwidth. Thus for a data channel having a bit rate of 100 KBS, use of a PN code with 256 bits produces a signal bandwidth of 25.6 MHz.

In the past it has been the practice to demodulate a PN-coded signal by multiplying the received IF component by the known PN code to obtain a cross-correlation function. When a high correlation output was obtained, indicating that the signal had been acquired, means were employed to "track" this desirable correlation state by controlling the times at which subsequent correlation operations were performed on the signal.

This system suffers from the disadvantage that it locks onto and tracks only a single signal component and if multipath components are present they are not detected. Most important, if the receiver happens to lock onto a multipath component rather than the main signal component, loss of synchronization at the receiver is highly likely to occur due to the susceptibility of the multipath to fading. This is particularly true when the transmitter and/or receiver are mobile (e.g., airborne) since the characteristics of the propagation medium are susceptible to relatively rapid change. Frequent loss of synchronization at the receiver is highly disruptive to the system and can result in loss of data unless very low throughput rates are employed.

Furthermore, when this type of receiver is used in a multiple access system where signals from several transmitting sources must be decoded simultaneously, the receiver is capable of locking onto and tracking only one signal at a time. Conferencing capability is thus not fully achievable. "Conferencing" in a communication system is the ability of a listener at a receiver to simultaneously hear the outputs generated by two or more transmitters in the network, such as occurs in a "party line" telephone hookup. Because the receiver in present spread spectrum communication systems locks onto and tracks only a single component of the received signal and excludes received components for which correlation matches occur at different times relative to the tracked signal component, conferencing is impossible unless all transmitters are synchronized to the same time base and are located exactly the same distance from the receiver. The latter condition, of course, cannot be achieved in a practical environment; particularly one involving mobile transmitters and receivers.

An experimental system known as "RAKE" was developed in the late 1950's as an approach to resolution of the multipath problem. This system employed tapped delay lines and multiple IF correlators for performing essentially two correlations in "parallel", one for detecting "mark" bits and one for detecting "space" bits. Means were provided for integrating correlation outputs in order to realign the main and multipath signals. All of the signal processing is done using IF signals and both phase and amplitude processing was provided. The "mark" and "space" signals were transmitted orthogonally. The response of the "space" correlator to a "mark" received signal is zero, and the response of the "mark" correlator to a "space" received signal is also zero. However, besides requiring the performance of multiple parallel correlation, this system due to its use of delay lines as the basic storage element, required separate IF correlation subsystems for each tap on the delay line.

Consequently, a very large amount of complex correlation circuitry was necessary and use of the system for any kind of mobile or transportable application was impossible. In addition, the detection sensitivity of the "mark" "space" concept is approximately 4 db poorer in performance than can be achieved by coherent processing in the manner described hereinafter.

OBJECTS AND SUMMARY OF THE INVENTION

It is therefore an object of the present invention to provide an improved spread spectrum correlation receiver capable of simultaneously tracking and detecting a plurality of time-delayed signal components.

Another object is to provide a spread spectrum correlation receiver of the type described which is capable of implementation in a low cost, compact and rugged circuit package suitable for portable and/or mobile utilization under rugged field conditions.

Another object is to provide a spread spectrum correlation receiver which uses baseband processing and baseband correlators instead of IF delay lines and IF correlators, and which provides system performance which is near-optimum and equal to or better than can be achieved through IF processing.

Still another object is to provide a high speed, inexpensive signal correlation subsystem capable of performing multiple correlations at a very high repetition rate and in essentially real time.

Still another object is to provide a spread spectrum correlation receiver of the type described which is capable of processing audio signals and simultaneously combining signals transmitted from multiple sources in order to provide a conferencing capability.

According to a first aspect of the invention multiple signal correlations are performed at a high repetition rate on a received PN coded signal by a correlation subsystem comprising a plurality of cascaded correlator circuits of the surface charge transistor (SCT) type. The outputs of the multiple correlations are accumulated during a sampling interval and at the end of the sampling interval the accumulated correlation outputs represent a composite of the data messages received during the sampling interval. In the case of a data link, the composite output signal may represent a single message bit which is the sum of a plurality of signal components (including multipath components) representing the same bit. In the case of an audio system, the composite output may represent a total signal made up of individual audio signal samples transmitted from a plurality of sources such that the audio output developed from a train of such accumulated composite signals gives the same effect as the mixing of a plurality of audio inputs into a single audio speaker channel.

In accordance with this aspect of the invention, correlation processing is performed after the received signal has been converted from IF to the baseband level and the baseband signal is represented by two orthogonal components which are processed in separate and independent channels. After processing, the outputs of the baseband channels are combined in a manner which yields an optimum IF signal response. The system tracks each of the baseband signals so that the effects of timevarying multipath signals with differential doppler between the direct and multipath components can be used to enhance system sensitivity. Further, the signals from each of the baseband channels are proportional to the weighted average of the doppler on the direct and multipath components such that they can be used for coarse doppler tracking.

In accordance with a second aspect of the invention, a signal correlation subsystem is provided wherein an N-stage correlation circuit receives and stores input signal samples in a rolling sequence that eliminates any need to transfer samples from stage to stage and allows samples to reside in the same stage until they are replaced by a new sample. In synchronizism with this sample loading sequence the bits of the reference signal are circulated through the stages in shift register fashion such that the last bit of the reference signal remains substantially in alignment with the newest input signal sample and the first bit of the reference signal remains substantially in alignment with the oldest stored signal sample. With this arrangement, N-point correlations are provided for an N-bit reference signal.

These and other objects, features and advantages will be made apparent by the following description of preferred embodiments of the invention, the description being supplemented by drawings as follows:

BRIEF DESCRIPTION OF THE DRAWINGS

FIG. 2b is a block diagram illustrating the circuits of the frame sync detector 110 of FIG. 2a.

FIGS. 4a and 4b, taken together, are a detailed circuit schematic showing a portion of the system of FIG. 2a.

FIG. 5 is a graphic illustration of the sequence in which input signal samples and reference signal samples may be loaded into and shifted through the correlator subsystem of the invention.

FIG. 6 is a schematic diagram depicting an SCT correlator stage as used in the correlator subsystem of the invention.

GENERAL DESCRIPTION OF EMBODIMENT

Figure 1:
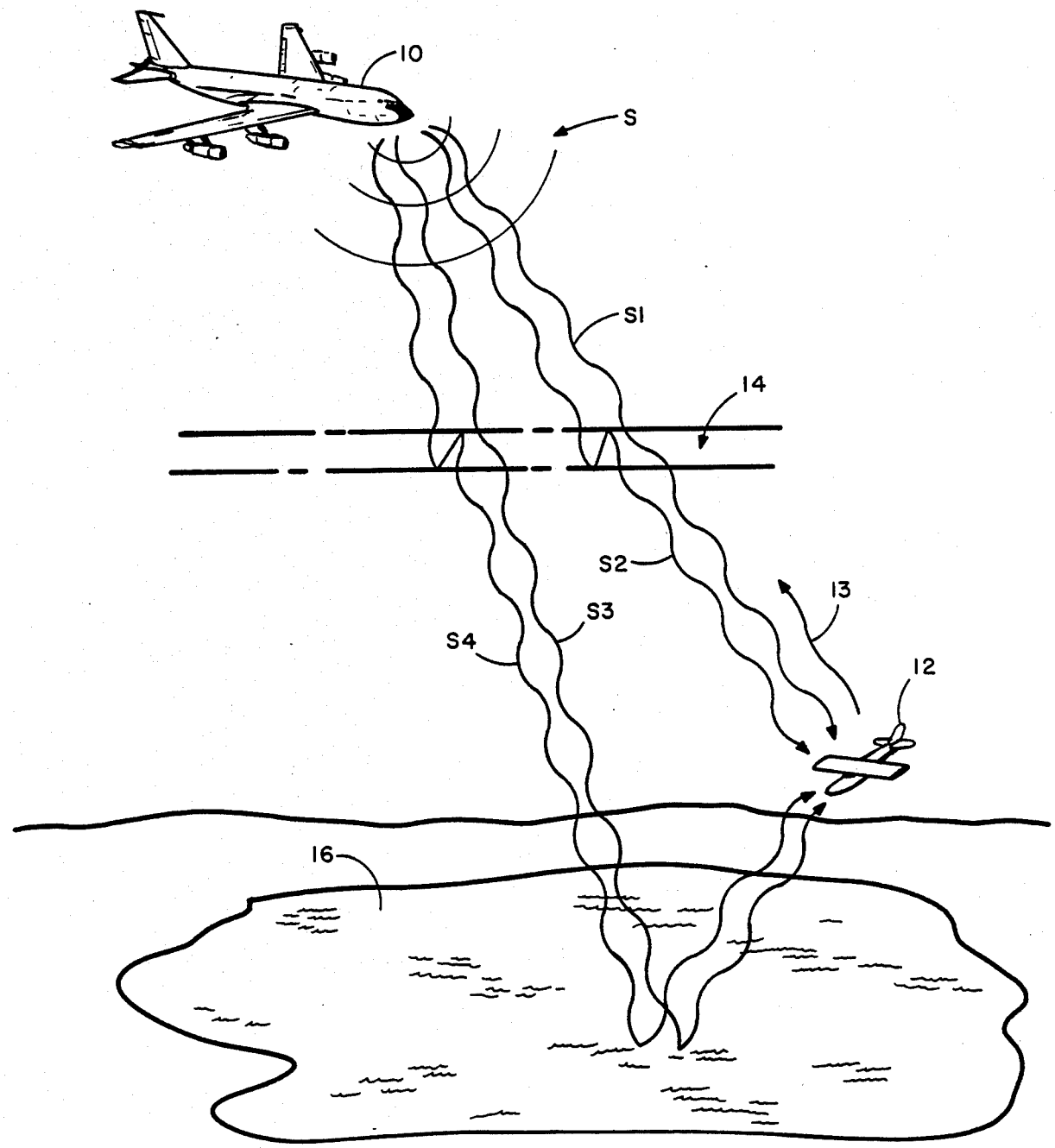
FIG. 1 is a schematic diagram illustrating one type of environment in which the system of the invention is designed to operate.

Referring to FIG. 1, a typical operating environment for the system of the invention is depicted. A transmitting station carried in an aircraft 10 is located at a remote distance from the receiver which is contained in a remotely piloted vehicle 12. It is desired to transmit a command signal S from the command station 10 to vehicle 12 in order to provide control data to the latter. In addition, a return signal 13 is generally transmitted from the vehicle 12 back to the command station for the purpose of returning control response data.

The environment confronting the system and the command signal S is very likely to include signal multipath generating elements such as atmospheric thermal inversion layer 14 and body of water 16. Atmospheric discontinuities such as layer 14 are likely to cause components of signal S to be reflected and/or refracted and the body of water 16 is likely to reflect signal components. As a result, the main signal component S1, which propagates directly from the transmitter to the receiver, may be accompanied by additional signal components S2, S3 and S4, known as multipath signals, or simply "multipath", which are reflected and/or refracted versions of the main signal component S1. The multipath components will arrive at the receiver sometime after the main signal component since, as is illustrated in FIG. 1, they traverse longer signal paths.

The multipath components are undesirable since they can interfere with the main signal and cause signal fading and consequent data loss at the receiver. Multipath caused by atmospheric reflection and/or refraction is generally referred to as "atmospheric multipath" and multipath caused by reflection from bodies of water is generally referred to as "specular multipath".

As heretofore described, a technique which has been used to eliminate the adverse effects of multipath involves a technique of correlation tracking of one of the signal components to the exclusion of the others. One of the drawbacks of this approach is that the system may lock onto one of the multipath components rather than the main signal component and when the characteristics of the environment change and the multipath fades, the receiver can lose lock and then has to acquire and lock onto another signal component. Reacquisition of the signal takes time and may result in loss of data at the receiver.

Figure 2A:
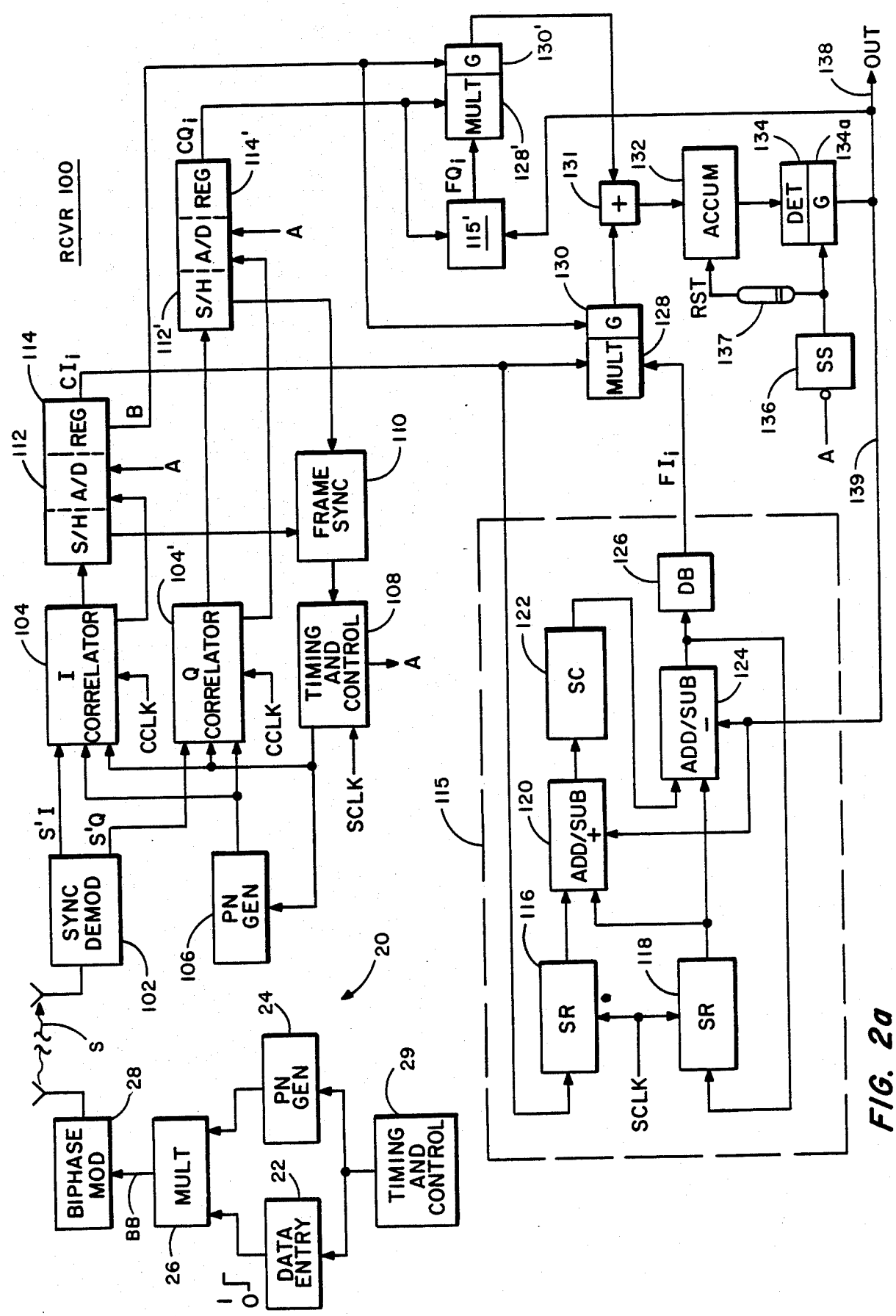
FIG. 2a is a block diagram showing the general circuit arrangement of the principal embodiment of the invention.

FIG. 2a shows a block diagram of a data communication system constructed in accordance with the principals of the invention. A transmitter 20 includes a data entry circuit 22 which generates binary coded data in accordance with desired command information. A PN code generator 24 generates a sequence of pseudo-noise coded binary reference bits. For example, the PN code bits may be stored in a read only memory (ROM) module and may be read out of the ROM in a desired time sequence. Multiplier circuit 26 combines the PN coded carrier signal from generator 24 with the binary data signal from data entry circuit 22 into a baseband signal BB and the latter is converted by a conventional biphase modulation circuit 28 to an RF wideband signal S. As previously mentioned, 3 db the bandwidth of signal S is N times the information bandwidth, where N is the number of PN code bits in each cell of the message data. Thus, if the data signal from circuit 22 has a frequency of 100 KBS and if PN generator 24 produces 256 carrier bits per message bit, the 3 db bandwidth of signal S is approximately 25.6 MHz.

Figure 3:
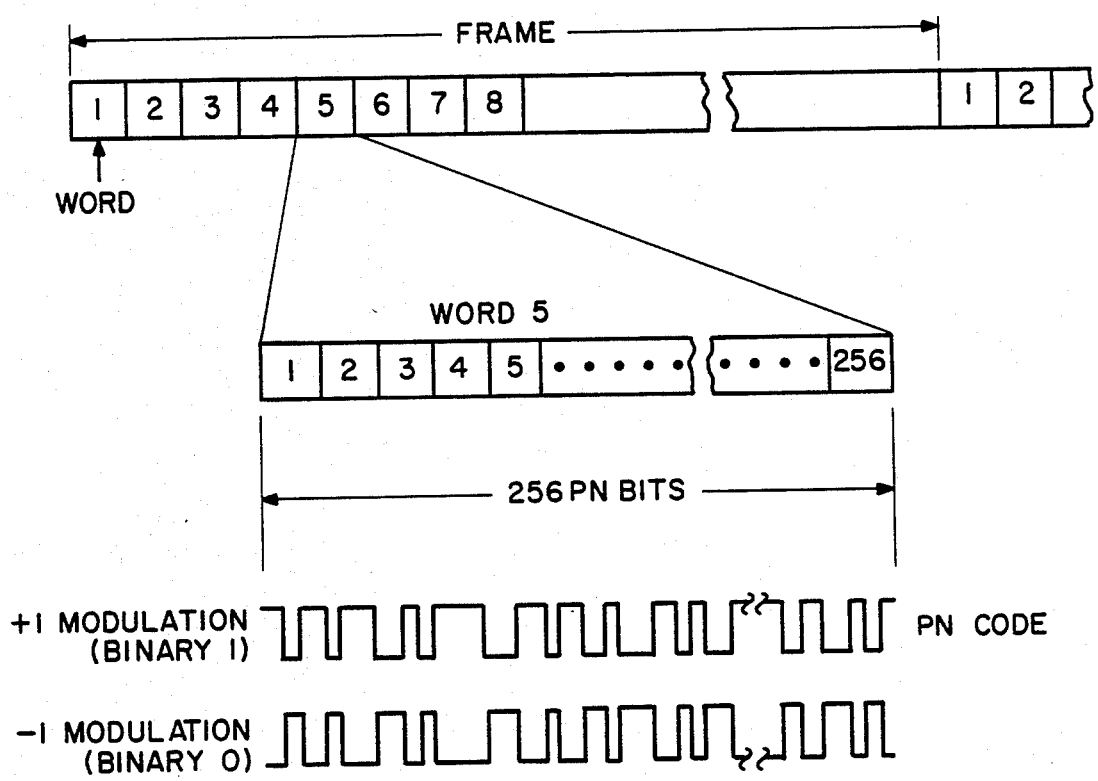
FIG. 3 is a schematic diagram showing the basic frame, word and bit format for transmitted messages used in connection with the principal embodiment hereinafter described.

The transmitted signal may be organized in accordance with the frame, word and bit format shown in FIG. 3. Each data frame may, for example, include eight single bit words, each word spanning 256 bits of the PN code. The latter is also illustrated in FIG. 3. The words may be positioned at the beginning of each data frame and the repetition rate, and thus the period, of the frames is selected in accordance with the desired data thruput rate.

As shown in FIG. 3, the PN carrier signal is a square wave made up of a series of binary bits arranged in accordance with conventional pseudo-random noise code generation techniques. As previously mentioned, the bits of the code occur in a predictable pattern but, for one who does not have knowledge of the generation formula, the bits appear to occur in a random sequence. When modulated (multiplied) by a "1" data bit, (+1 modulation), the PN coded carrier signal is simply a replica of itself. When modulated by a 0 data bit (−1 modulation), the carrier is the inverse of the generated code, as shown in FIG. 3.

Referring back to FIG. 2a, a receiver 100 comprises a conventional synchronous demodulator 102 for converting the input signal into two baseband signals S'I and S'Q. The synchronous demodulator may comprise, for example, an IF converter for converting the received RF signal to an IF signal together with a synchronous detector. The first signal S'I is a signal which contains multiple replicas of the transmitted signal as it appeared at the output of multiplier 26 at the transmitter. Each replica has a delay relative to the first replica "direct signal" and a weighting factor which is dependent on the phase delay of the signal relative to the reference oscillator in the synchronous demodulator.

These signals may be defined as follows:

$$S'I(t) = S_1(t-T_1)\cos\phi_1 + S_2(t-T_1-T_2)\cos\phi_2 + S_i(t-T_1-T_i)\cos\phi_i +$$

where
S'I(t)=in-phase output of the synchronous detector;
$S_1(t-T_1)$=direct signal replica of the baseband signal delayed by a time $T_1$ which is dependent on the range between transmitter and receiver;
$S_i(t-T_1-T_i)$=$i^{th}$ multipath replica of the baseband signal delayed by a time $T_i$ after the direct signal;
cos $\phi_1$=weighting function for the direct signal;
cos $\phi_i$=weighting function for the $i^{th}$ multipath;
$\phi_1$=phase angle difference between the carrier of the direct signal and the oscillator reference in the synchronous demodulator; and
$\phi_i$=phase angle difference between the carrier of the ith multipath and the oscillator reference in the synchronous demodulator.

The second signal S'Q is a signal which also contains multiple replicas, but each replica is weighted by the sine of the respective phase angle difference:

$$S'Q(t) = S_1(t-T_1)\sin\phi_1 + S_2(t-T_1-T_2)\sin\phi_2 + S_1(t-T_1-T_1)\sin\phi_1$$

where S'Q(t)=quadrature output of the synchronous detector.

The two signals S'I and S'Q are processed independently and identically as shown in FIG. 2a. The correlator subsystems 104 and 104' both receive the reference signal R from PN generator 106. The signal replicas are converted to correlation signals $CI_i$ and $CQ_i$ through performance of a series of 256-point correlations between the S'I and S'Q and the binary reference signal R which represents the identical PN code used at the transmitter. The correlation signals $CI_i$ and $CQ_i$ are fed to conventional analog to digital converters 112 and 112' for conversion to digital signal bytes. A frame sync detection circuit 110 monitors the correlation magnitude $|C_i|$ by deriving a signal which is dependent on both $CI_i$ and $CQ_i$. This function is obtained by squaring and adding the two outputs, $$|C_i|^2 = (CI_i)^2 + (CQ_i)^2$$

The magnitude $|C_i|$ is compared to a predetermined threshold level during each sample and hold cycle. A signal above the threshold provides an output signal SYNC to timing and control circuits 108. As described subsequently, this operation is required in order to synchronize the receiver to each successive data frame.

Each data frame, which comprises eight single bit words (FIG. 3) includes a synchronization or preamble word in the initial (word 1) position. Timing and control circuits 108 are arranged such that the system re-synchronizes at the beginning of each data frame by doing a continuous correlation scan operation on word 1. In this operation the PN coded reference word corresponding to word 1 is continuously circulated in the correlator circuits 104 and 104' until the combined correlation output signal $|C_i|$ is observed by frame sync circuit 110 to exceed a predetermined threshold level. When this frame sync signal is detected by circuit 110 a signal SYNC is outputted to the timing and control circuits 108 and the latter are triggered into operation and are driven under control of the timing signal SCLK through a repetitive clock cycle with results in the detection of data words 2 through 8.

Correlator circuits 104 and 104' may include surface charge transistor (SCT) correlator devices of the type described by J. J. Tiemann, et al. on pages 154 and 155 of the 1974 IEEE International Solid-State Circuits Conference "Digest of Technical Papers". A similar device is also disclosed in the U.S. Pat. No. 3,801,883 issued to J. J. Tiemann and entitled "Surface Charge Signal Correlator". The SCT correlator is a multi-stage device which may be controlled to sample an analog signal such as the baseband signal S'I and to store samples of that signal in the correlator stages. Each stage is further controlled by one bit of the reference signal R to transfer ("slosh") the stored signal charge to one sensing point or another depending on the value of the binary reference bit from the signal R. The correlator circuits 104 include eight 32-stage correlator circuits connected in series so that a total of 256 correlator stages are provided. Timing and control circuits 108 drive the correlators so that 256 consecutive samples of the signal S'I are stored and are compared against the 256 bits of the reference signal R simultaneously so that the correlation output signal $CI_i$ indicates the cross-correlation value for the signals S'I and R based on a 256-point correlation therebetween. Correlator circuits 104' are identical to circuits 104 and operate on signal S'Q in an identical fashion.

Timing and control circuits 108 control the correlator circuits in accordance with a novel control sequence which loads the analog signal samples into the correlation stages in a rolling pattern that eliminates the need to shift analog signal samples between stages. The bits of the PN coded reference signal are shifted through the stages in shift register fashion but are loaded into the correlator circuits such that the last bit of each given reference word stays in alignment (occupies the same correlator stage) with the newest analog signal sample. This loading and shifting arrangement assures that when the bits of the PN coded carrier embodied in S'I and S'Q line up with the bits of the reference word R, a full 256-point correlation is realized. If the last bit of the reference word is not maintained in alignment with the newest signal sample, the best that can be achieved is something less than a 256-point correlation and the correlation signals $CI_i$ and $CQ_i$ will not represent the optimum possible correlation output.

Successive correlation outputs, after being converted to binary bytes, are stored in registers 114 and 114' whereupon they are supplied to adaptive filter networks 115, 115' each of which includes a pair of shift registers 116 and 118, a multiplier circuit 128 and a signal processing network including adder-subtractor circuits 120 and 124, scaler circuit 122 and deadband circuit 126.

In filter 115, each successive correlation output appearing in register 114 is multiplied by multiplier 128 with a smoothed correlation signal $FI_i$ applied to multiplier 128 from the output of adder-subtractor 124 through deadband circuit 126. The value of the signal $FI_i$ is determined in accordance with the following equation:

$$FI_i = FI_{i-1} + d_{i-1}K(CI_{i-1} - d_{i-1}FI_{i-1}) \quad (1)$$

where $FI_{i-1}$ represents the value of the smoothed correlation signal that was determined during the correlation performed on the preceding data word, $CI_{i-1}$ represents the correlation output signal for the preceding data word and $d_{i-1}$ represents the data value (+1 or −1) that was detected for the preceding data word.

Thus, when the preceding data word was detected to be a +1 the value of the smoothed correlation function is $FI_i = FI_{i-1} + K(CI_{i-1} - FI_{i-1})$ and if the value of the preceding data word was determined to be a −1 the smoothed correlation function is $FI_i = FI_{i-1} - K(CI_{i-1} + FI_{i-1})$. The correlation output as modified by the smoothed correlation function $FI_i$ is gated from the multiplier 128 by gate circuit 130 into an accumulator circuit 132.

The Q channel correlation output $CQ_i$ is processed by a circuit 115' identical to circuit 115 and the modified correlation output generated by multiplier 128' is gated by gate circuit 130' to accumulator 132. The I and Q channel outputs are combined by an adder 131 before presentation to the accumulator. A detector circuit 134 provides a data output signal on a line 138 for each data word after the modified correlation outputs for that word have been accumulated in accumulator 132. A gate circuit 134a operated by a single-shot multivibrator 136 gates the output from detector 134 to line 138 after the appropriate accumulation (integration) period for each data word. Delay circuit 137 provides a reset signal RST for restoring the accumulator to its original state in preparation for the next integration cycle.

In the above equation (1), the term $K(CI_{i-1} - FI_{i-1}d_{i-1})$ is determined by the adder-subtractor 120 which receives one input from shift register 116 and another input from shift register 118. The latter stores the smoothed correlation output values calculated during detection of the preceding data word and thus supplies an input equal to $FI_{i-1}$. Shift register 116 stores the correlation outputs generated during the detection of the preceding data word and thus supplies an input representing $CI_{i-1}$. The value $d_{i-1}$ (+1 or −1) for the preceding data word supplied on output line 138 is fed back on line 139 and sets adder-subtractor 120 to either the add state or the subtract state, depending upon the polarity of the preceding data word. Scaler circuit 122 multiplies the output from adder-subractor 120 by a predetermined scaling constant K so that it supplies at its output the term $K(CI_{i-1} - d_{i-1}FI_{i-1})$.

Adder-subtractor 124 processes the latter signal by adding it to or subtracting it from the output of shift register 118. As above stated, the latter supplies a signal representing $FI_{i-1}$. Adder-subtractor 124 is also controlled by the signal on line 139 representing the polarity of the last detected data word. Thus, the signal from scaler 122 is either added to or subtracted from the signal from shift register 118 and the output signal $FI_i$ represents the smoothed correlation output $FI_i$ in accordance with the above equation (1). Deadband circuit 126 passes the signal $FI_i$ on to multiplier 128 unaltered if the value of $FI_i$ exceeds a predetermined threshold. However, if the threshold is not exceeded, deadband circuit 126 supplies a 0 to multiplier 128.

As previously mentioned, the Q channel circuit 115' is identical to I-channel circuit 115 and its operation is the same as described above.

Thus, in operation, timing and control circuits 108 operate to initially load the PN reference code for word 1 into correlators 104 and 104' and to control the correlators to perform a continuous sequence of 256-point correlations between input signals S'I and S'Q and the reference code. When a desired correlation output signal $|C_i|$ is detected by frame sync circuit 110, the PN reference code for word number 2 is loaded into the correlator circuits and at a time which is determined by the time of occurrence of the initial SYNC signal, timing and control circuits 108 control the correlators to perform a series of 256-point correlations during a "sampling window." The latter defines an interval during which a high correlation match between the PN reference code and word 2 will be achieved. All correlation outputs $CI_i$ and $CQ_i$ generated during this sampling interval are processed through the adaptive filters and accumulated in accumulator 132. As correlations are performed over a sequence of sampling intervals representing several data words the adaptive filters build up the smoothed correlation functions $FI_i$ and $FQ_i$ which, operating through multipliers 128 and 128', further enhance the correlation output signals and suppress noise therefrom.

The duration of the sampling interval is set such that all atmospheric and spectral multipath components of the main signal will arrive at the receiver during the sampling interval. Multipath components will be processed by both correlator circuits and by both adaptive filters in the same manner as the main signal component such that at the end of the sampling interval accumulator 132 will contain the sum of all modified correlation outputs generated by both the main and multipath signals. The detected output signal appearing on line 138 is thus a composite of the main and multipath signal components.

The output signal at 138 is the signal to noise ratio of the weighted sum of each term of the multipath signal and an independent noise. The amplitude weighting has been done proportional to the signal strength of each component. Each component has been optimally weighted independent of its phase delay. The output SNR ratio has a maximum positive value if a $+1$ ($d_i$) has been transmitted, and has a maximum negative value (signal to RMS noise ratio) for a $-1$ ($d_i$). The detection SNR is identical to the SNR of multiple coherent phase tracking receivers.

The system of the present invention is therefore capable of detecting not only main signal components but also the multipath repetitions thereof and utilizes the latter to improve the signal detection function (SNR). Fading of the multipath does not appreciably affect the detected output. Furthermore, as the characteristics of the environment change, altering the characteristics of the multipath, the adaptive filters cause the smoothed correlation function signals $FI_i$ and $FQ_i$ to change accordingly such that the processing gain of the system remains extremely high regardless of the characteristics of the environment.

DETAILED DESCRIPTION OF EMBODIMENT

Figure 4A:
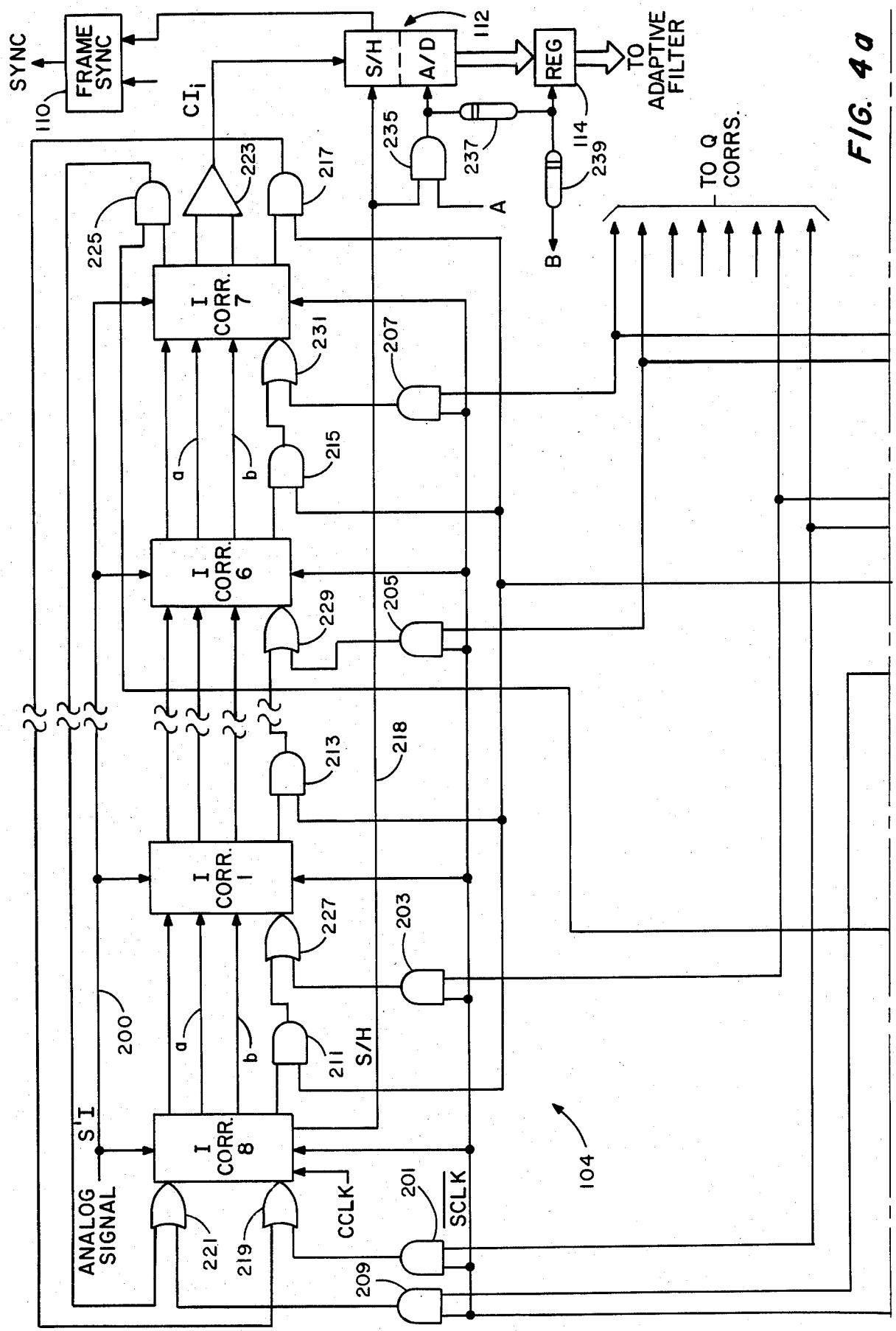
Figure 4B:
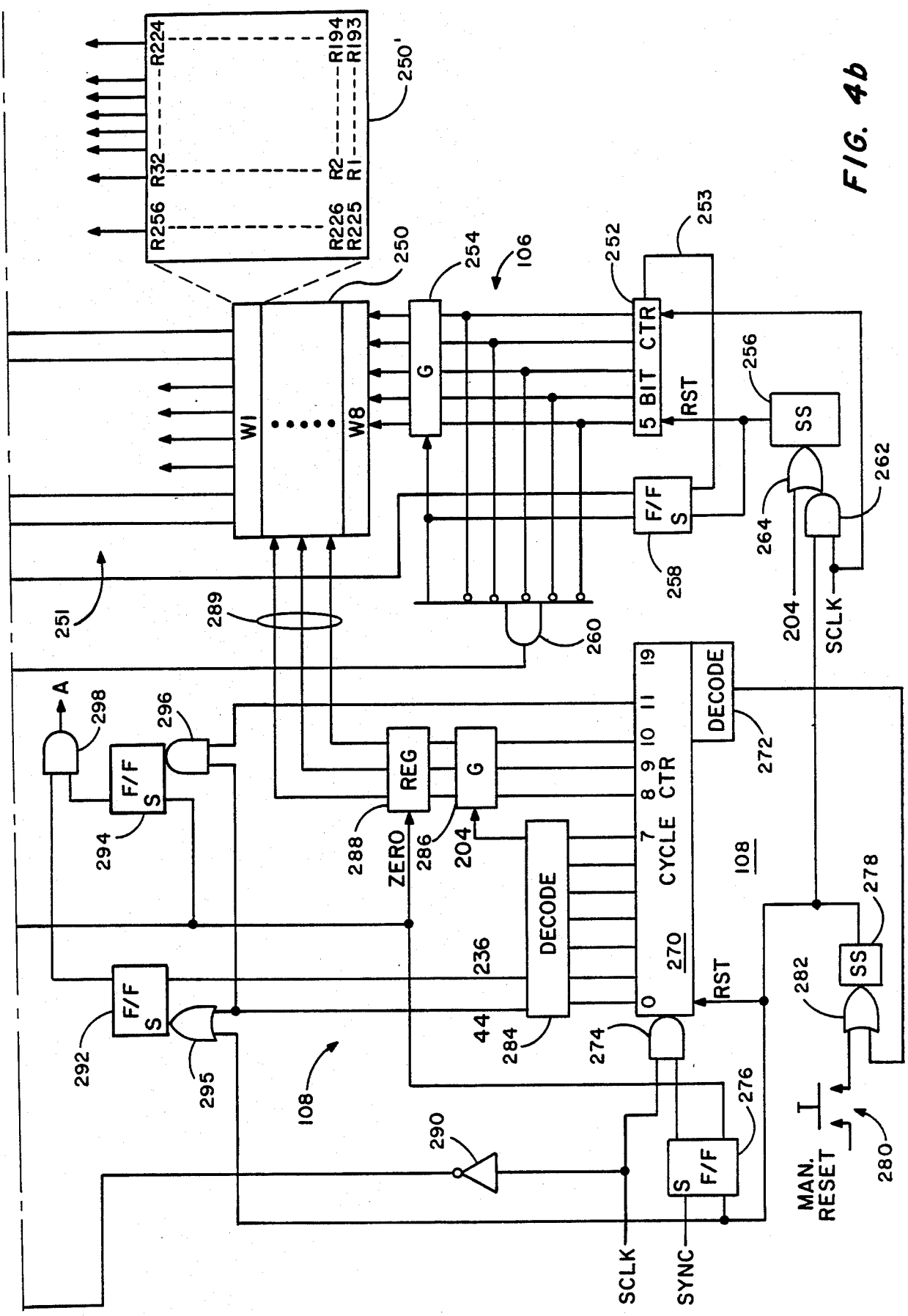

Referring to FIGS. 4a and 4b, the circuit details of the correlator circuits 104 and 104', PN generator 106 and timing and control circuits 108 of FIG. 2 are hereinafter described. PN generator 106 includes a read only memory (ROM) 250 (FIG. 4b) and associated readout circuits including a 5 bit address counter 252, gate circuit 254, single-shot multivibrator circuit 256 and flip-flop 258. ROM 250 stores eight 256-bit binary reference words representing the eight PN codes associated with words 1 through 8 of each of the transmitted data frames (FIG. 3). The enlarged offset 250' shown in FIG. 4b indicates the manner in which the 256 bits of preamble word W1 are stored in memory 250. The bits of words 2 through 8 are stored in a similar fashion. As shown, the reference bits are stored in eight columns of 32 bits each. Bit R256 is the last bit in the PN code sequence and bit R1 is the first bit in the sequence.

Address counter 252 has its five output lines connected to the readout drivers of memory 252 through gate circuit 254. Each of the 32 combinations of outputs of counter 252 causes a different row of reference bits to be read out of memory 250 and to appear on output lines 251. A counter output of 00000 reads out the row of reference bits beginning with bit 256 (see offset 250') and a counter output of 11111 reads out the row of reference bits beginning with bit R225.

Address counter 252 is reset to 00000 by an output from single-shot multivibrator 256. The counter is incremented by SCLK, which is the basic system clock signal (see FIG. 9) supplied by a conventional square wave oscillator (not shown). When single-shot 256 resets counter 252, it also sets flip-flop 258 whereupon gate circuit 254 is opened. This allows the 00000 output from the counter to read out the first row of reference bits from memory 250. At the same time an AND circuit 260 responds to the all-zero output from counter 252 and produces a scan bit signal which is presented to the correlator circuits. On the next SCLK pulse, the counter 252 increments to 10000 and the second row of PN reference bits is read out of the memory. After 32 SCLK pulses, all 32 rows of reference bits have been read out of the memory. The 33rd SCLK pulse causes a carry signal to appear on counter output line 253 which resets flip-flop 258 and closes gate 254. This prevents any further readout of memory 250 until single-shot 256 is again energized.

Single-shot 256 is controlled by signals from the timing and control circuits 108 shown on the left portion of FIG. 4b. The timing and control circuits include a twenty stage cycle counter 270, a pair of decode circuits 272 and 284, a gate circuit 286 and a ROM address register 288. In addition, the timing and control circuits include control flip-flops 276, 292 and 294 as well as a single-shot 278 which is energized in response to actuation of a manual reset key 280 or by an output from decode circuit 272.

Operation of the system is initiated by actuation of manual reset key 280 whereupon single-shot 278 is energized through OR gate 282. The output from single-shot 278 resets cycle counter 270 such that the outputs therefrom are all zeros with the exception of the 8th bit position, which is set to the one state. The output from single-shot 278 also triggers single-shot 256 which initiates readout of a reference word from memory 250 as previously described. In addition, the output from single-shot 278 resets flip-flop 276 and causes flip-flop 292 to be set through OR gate 295. Also, resetting of flip-flop 276 forces address register 288 to an all-zero state, causes flip-flop 294 to set and conditions AND gate 225 in the correlator circuits (FIG. 4a).

The timing and control circuits remain in the state just described until a SYNC input is received from frame sync circuit 110. SYNC operates to set slip-flop 276. This does not occur until the correlation circuits detect a correlation match between the preamble reference word W1 and the received baseband signal $S'I - S'Q$. When SYNC occurs, flip-flop 276 conditions AND gate 274 such that on the next SCLK pulse cycle counter 270 starts counting. Also, setting of flip-flop 276 removes the zero hold signal from address register 288 and deconditions AND gate 225 in the correlator circuits.

When counter 270 reaches a count of 44, flip-flop 292 receives a set input through OR 295 (although as is noted from the above description flip-flop 292 is already in the set condition).

When counter 270 reaches a count of 204, gate 286 opens to transfer a count of 100 to address register 288 and at the same time the "204" output of decoder 284 causes OR 264 to energize single-shot 256 in the PN generator circuits. The latter action initiates the previously described 32-pulse memory readout operation, although this time the 256 bits of reference word W2 are read out due to the 100 count in register 288.

Thirty-three clock pulses later, after the bits of word W2 have been read out of the memory, counter 270 reaches a count of 236 and decode circuit 284 generates an output signal which resets flip-flop 292. This actuates AND gate 298 and generates a control signal A which defines the sampling interval for the correlator circuits (to be described subsequently) and permits the actuation of analog/digital converters 112 and 112′ to convert the correlation output signals $CI_i$ and $CQ_i$ to digital form. Cycle counter 270 continues to increment and when it reaches a count of 257 the 0 through 7 output stages of the counter return to an all-zero state and the 8, 9 and 10 stages of the counter assume the values 0-1-0, respectively. When the 0 through 7 counter stages again reach a count of 44, flip-flop 292 is set and control signal A terminates, disabling AND gate 235 (FIG. 4a) and turning off analog-digital converter 112 and its Q channel counterpart 112′.

When the 0 through 7 stages of counter 270 again reach a count of 204, gate 286 is again opened and the count of 010 is entered into address register 288. At the same time, single-shot 256 is energized whereupon the 256 bits of reference word W3 are read out of memory 250. At the count of 236 control signal A once again comes up and at the count of 257 the 0 through 7 stages of counter 270 reset to zero and the 8, 9 and 10 stages advance to a binary count of 110, respectively.

Cycle counter 270 continues cycling in the above described manner until all eight reference words are read out of the memory 250. After each reference word has been read out, control signal A comes up and stays up for 64 pulses of SCLK.

213 counts after control signal A terminates following the readout of reference word W8, stage 11 of counter 270 switches from zero to one. When this occurs AND 296 is conditioned by the output from the 11th stage of the counter. The next time decode circuit 284 generates a "44" output signal, flip-flop 294 is reset by AND 296 and AND 298 is disabled so that control signal A cannot reoccur until single-shot 278 is once again energized. The latter will occur when decode circuit 272 generates an output to OR 282 after counter 270 has reached a predetermined count. This count may be selectively set into decode circuit 272 by manually operable switches (not shown) by which an operator can select a counter period coinciding with the period of the data frames (FIG. 3) occurring in the transmitted signal S.

The circuits of the I channel correlator subsystem 104 are shown in FIG. 4a. Q channel correlator subsystem 104′ is identical and thus will not be separately described. As shown, there are eight I correlator circuits CORR 1–CORR 8 connected in a sequential arrangement. Each correlator circuit includes a plurality of correlation stages and, in the present example, since there are 256 bits in each word of the reference signal, there are 32 correlation stages in each correlator circuit. As will be described in greater detail subsequently, each correlator circuit includes a 32-stage shift register for receiving the bits of the reference word and also includes a 32-stage shift register for circulating a single scan bit. The latter controls the sampling of analog signal S′I (appearing on input bus 200) and the storage of appropriate signal charge levels in the stages of the correlator circuits.

AND gates 201, 203, 205 and 207 operate under the control of timing signal $\overline{SCLK}$ supplied by an inverter 290 (FIG. 4b) to load the bits of the reference words into the reference shift registers of the correlator circuits. AND gate 201, which is connected through OR 219 to the shift register input of correlator circuit 8, receives the outputs from the first column of ROM 250 (reference bits R256, R 255, etc.). Similarly, AND gate 203, which feeds the reference word shift register of correlator circuit 1, is connected to the second column output line from the ROM while correlator circuits 2 through 7 are connected to the third through eighth column readout lines, respectively.

Each of the reference word shift registers in the correlator circuits has its output connected to the input of the next correlator circuit through a pair of circuits such as AND 211 and OR 227. Thus, once the bits of the reference word have been loaded into the shift registers of the correlator circuits, the bits continue to circulate through the shift registers in a closed-loop fashion under control of $\overline{SCLK}$.

A single scan bit is entered into the scan bit shift register of correlator circuit 8 by AND 209 which receives the scan bit input from the AND circuit 260 located in the PN generator circuits (FIG. 4b). As previously described, a scan bit is generated by AND 260 only when the address counter 252 is in an all-zero state so that the scan bit is entered by AND 209 into the first stage of the scan bit shift register of correlator 8 through OR 221 at the same time that PN code reference bit R256 is loaded into the first stage of the reference word shift register also associated with correlator circuit 8. Thereafter, each time $\overline{SCLK}$ advances the reference word bits by one stage in the reference word shift registers, the scan bit is also advanced by one stage in the scan bit shift registers. The scan bit thus is always located in the same correlation stage as reference bit R256, i.e., the scan bit stays in alignment with reference bit R256 throughout operation of the correlator circuits.

AND gates 211, 213, 215 and 217 are provided at the outputs of the reference words shift registers of correlator circuits 8, 1, 6 and 7 respectively. Correlator circuits 2 through 5 are constructed in an identical fashion to correlator circuit 1 and thus have been omitted from FIG. 4a in order to simplify the drawing. The purpose of AND gates 211, 213, 215, 217, etc. is to block the outputs from the reference word shift registers during the time that a new reference word is being loaded. Thus these AND gates are connected to the reset side of flip-flop 258 in the PN generator circuits so that they receive a disabling input during the reference word load cycle.

Similarly, AND gate 225 is provided at the output of the scan bit shift register associated with correlation circuit 7. This AND gate is opened only when flip-flop 276 in the timing and control circuits (FIG. 4b) is reset. Thus, when reference word W1 is circulating through the correlation circuits during the synchronization cycle which occurs at the beginning of the initial data frame, the scan bit is permitted to circulate continuously through the scan bit shift registers of the eight correlator circuits. However, after synchronization has occurred and cycle counter 270 is controlling the system, the scan bit used with each reference word is erased by AND 225 before correlation outputs begin to be sampled based on the next reference word which is used during the next word detection cycle.

Each correlator circuit has a pair of output lines a and b on which the correlation output signals appear. All of the output lines for the eight correlator circuits are channeled to a differential amplifier 233 which provides a correlation output signal $CI_i$ representing the sum of the correlation outputs of all 256 stages. Correlation signal $CI_i$ is fed to analog/digital converter 112. During each $\overline{SLCK}$ clock pulse a signal S/H is presented on line 218 for activating the sample and hold circuit within the converter 112. The sampled signal level is provided to both the frame sync detection circuit 110 and the analog/digital converter. The latter converts the analog signal level to an eight-bit binary byte in response to an input received from AND gate 235. The signal from AND 235, after passage through a delay circuit 237, loads the output from the A/D converter into register 114. The short delay time of circuit 237 is required to permit the converter outputs to settle out. The signal from AND 235 is also channeled through a second delay circuit 239 to produce a control signal B. This signal is used to open gate 130 (FIG. 2) to feed the modified correlation signal out of the adaptive filter and into accumulator 132.

FIG. 6 symbolically represents one stage of the correlator circuits. As previously mentioned, the correlator is a surface charge transistor (SCT) device which may be constructed in accordance with the teaching of U.S. Pat. No. 3,801,883. A semiconductor substrate represented at 15 contains three surface-adjacent charge storage regions which are separated by two independently controllable barrier regions. The charge storage regions are controlled by three surface charge reservoir electrodes RE1 (upper), RE2 (center) and RE3 (lower) while the intermediate barrier regions are controlled by a pair of transfer gates. In addition, a scan gate operates to transfer a quantity of charge into the upper charge storage region in accordance with the level of signal present on input lead 17, which is connected to the input bus carrying analog signal S'I. This analog charge quantity representing the sampled value of signal S'I is then transferred to the center charge storage region by operation of the transfer gates and thereafter the charge is sloshed to either the upper charge storage region or the lower charge storage region in accordance with the value of the reference word bit (1 or 0) which is stored in the reference word shift register stage connected to the transfer gates. After each such transfer the charge level stored in the upper or lower charge storage region is sampled and read out on the a output bus or the b output bus.

Figure 7:
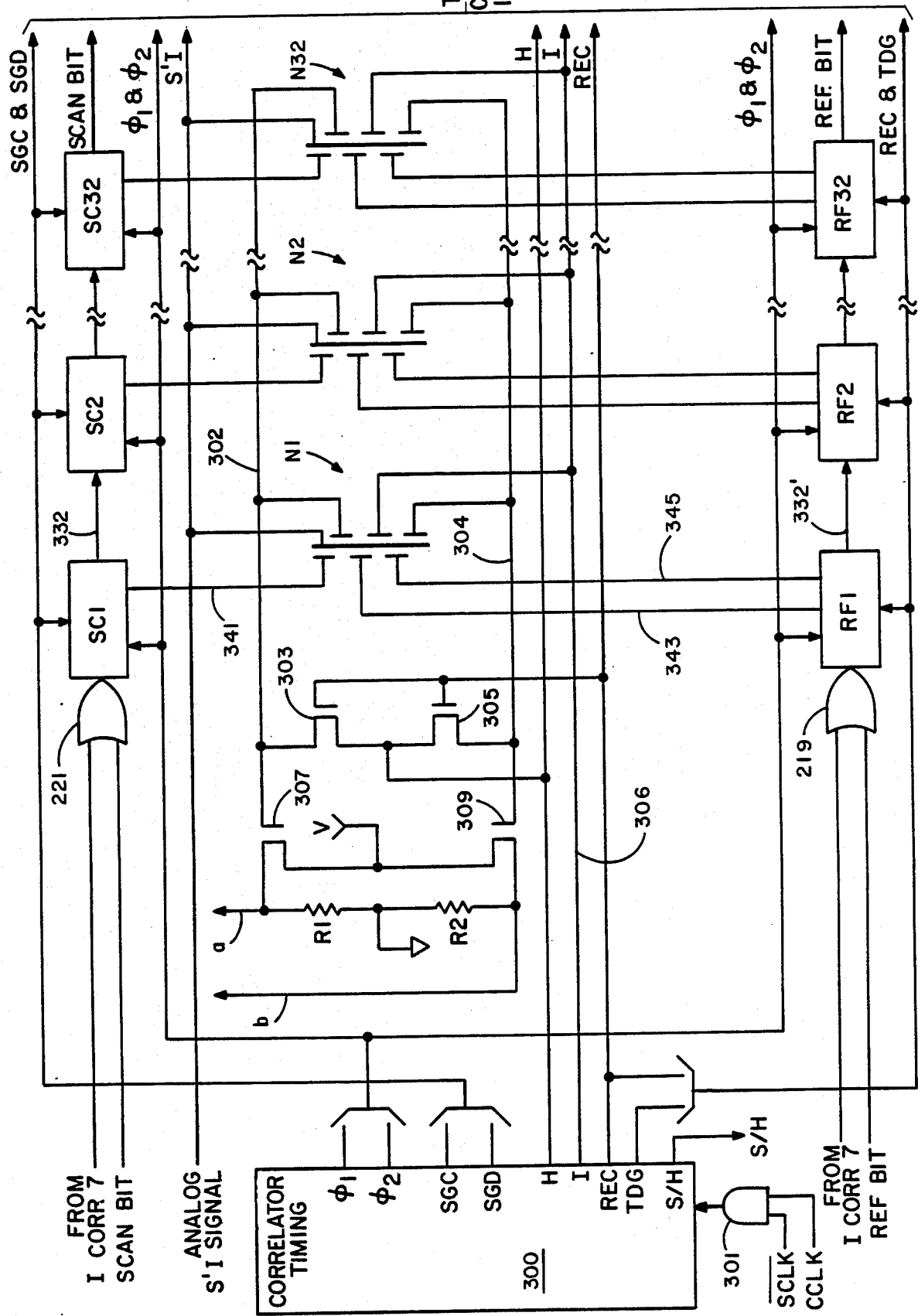
FIG. 7 is a schematic circuit diagram illustrating a 32-stage correlator circuit.

FIG. 7 schematically illustrates the circuit details of correlator circuit 8 (FIG. 4a). The circuit includes 32 correlator stages N1, N2 ... N32 which are controlled by timing signals generated by correlator timing circuit 300. Correlator circuits 1 through 7 are identical in construction to correlator circuit 8 (except for correlator timing circuit 300) and thus will not be described separately. Correlator timing circuit 300 provides timing signals for controlling all eight of the correlator circuits.

As shown, correlator stage N1 has its scan gate connected to the first stage SC1 of the scan bit shift register. The transfer gates of correlator stage N1 are connected to the first stage RF1 of the reference word shift register. Similarly, correlator stages N2 through N32 have their scan gates connected to stages SC2 through SC32 of the scan bit shift register and have their transfer gates connected to stages RF2 through RF32 of the reference word shift register.

The upper charge reservoir electrodes of all correlator stages are connected in common to a signal bus 302 while the lower charge reservoir electrodes of the correlator stages are commoned to a signal bus 304. The center reservoir electrodes are connected to a control line 306.

Output circuits including field effect transistor (FET) series switches 303 and 305 are provided for controlling the voltage levels on signal sampling lines 302 and 304 so that the sum of the charge stored at the respective reservoir electrodes of the 32 correlator stages can be sampled. FET source followers 307 and 309 are provided for generating output signals on correlator output lines a and b which are proportional to the sampled charge levels. As indicated in FIG. 7, the various timing signals provided by timing circuit 300 are also connected through to correlator circuits 1 through 7.

Figure 9:
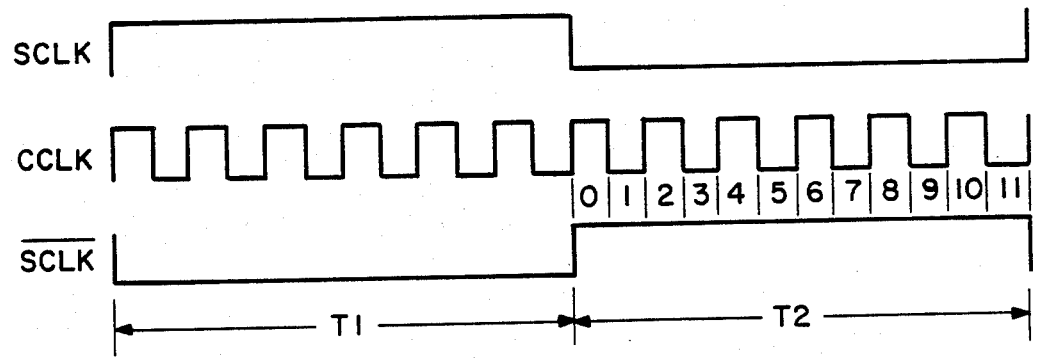
FIG. 9 is a waveform diagram showing the relationship between the basic clock pulses SCLK, $\overline{SCLK}$ and CCLK used in connection with the circuits of FIGS. 4a, 4b, 7 and 8.
Figure 8:
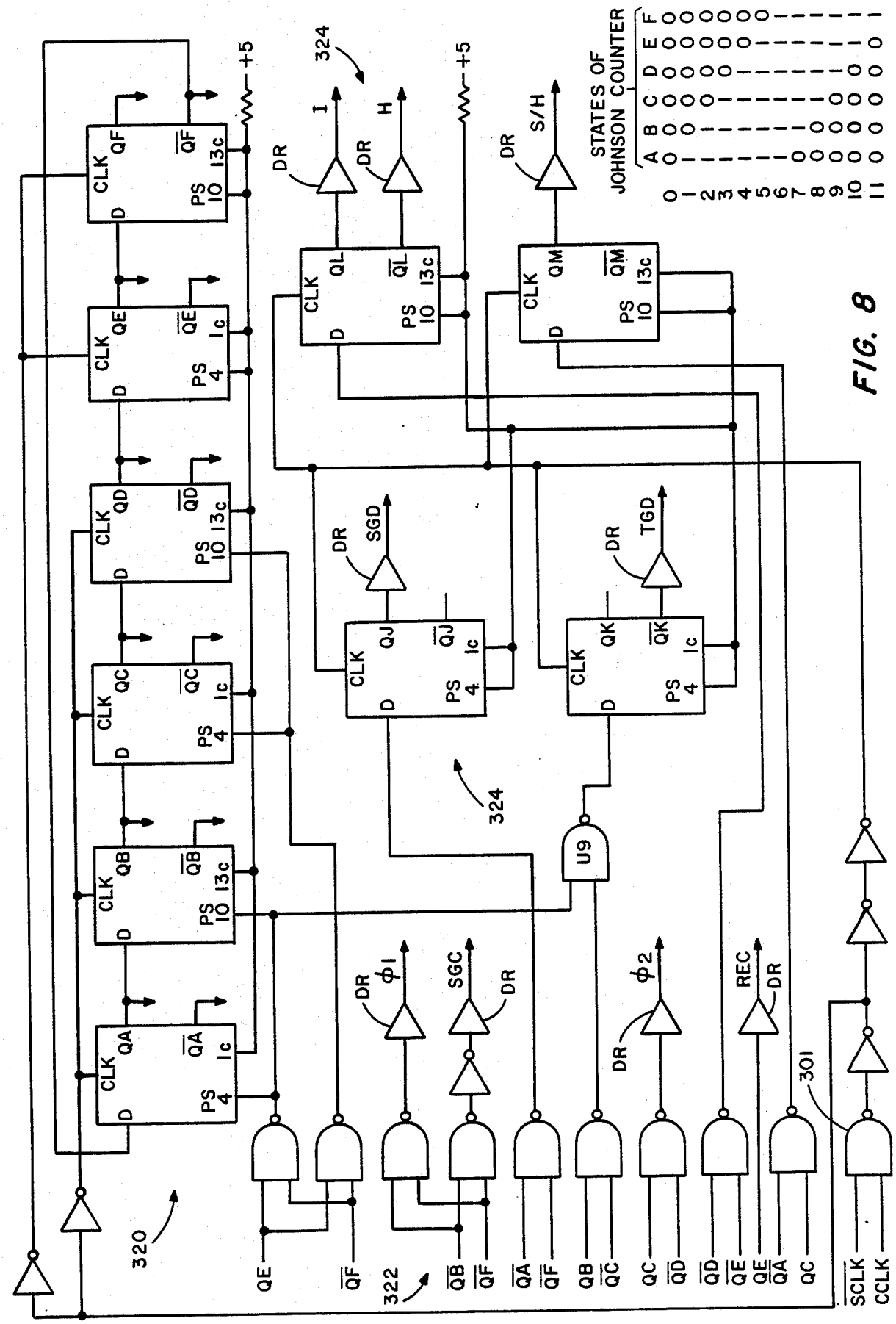
FIG. 8 is a schematic circuit diagram showing the correlator timing circuits of FIG. 7.

FIG. 8 shows the arrangement of correlator timing circuits 300. The basic input to the timing circuits is a square wave clock signal provided by AND gate 301 in response to CCLK and $\overline{SCLK}$. As shown in FIG. 9, CCLK is generated at twelve times the frequency of SCLK. SCLK is positive during interval T1 while $\overline{SCLK}$ is positive during interval T2. The latter is divided into twelve equal time segments 0 through 11 by the CCLK signal. Those twelve time intervals define a single cycle of operation of the correlator circuits. AND 301 (FIG. 8) operates during T2 to supply CCLK to the timing circuits.

Figure 10:
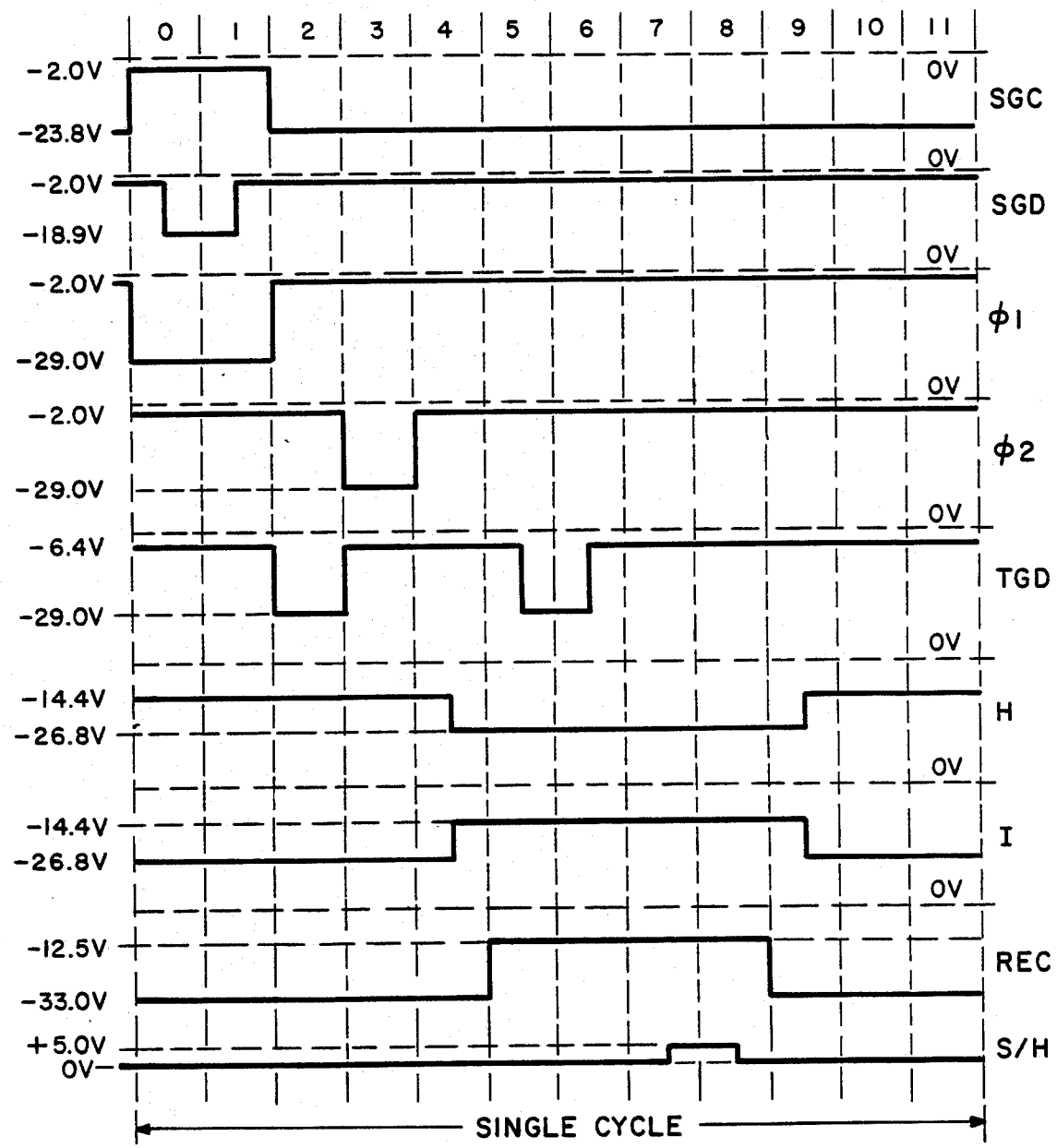
FIG. 10 is a waveform diagram showing the interrelation of the various timing signals used to control the correlator circuits.

As shown in FIG. 8, the timing circuits include a series of flipflops 320 interconnected to form a so-called Johnson counter. During one cycle of correlator operation, counter 320 is driven by the twelve timing signals from AND 301 through the twelve different output states defined by the table shown in FIG. 8. The outputs from counter 320 are connected to logic gates 322 and to additional flip-flops 324 in the manner shown to produce the nine timing signals SGC, SGD, $\phi 1$, $\phi 2$, TGD, H, I, REC and S/H. The interrelationship of these nine timing signals is shown in FIG. 10. The timing signals are supplied through appropriate driver circuits DR (FIG. 8) to the eight correlator circuits.

Figure 11:
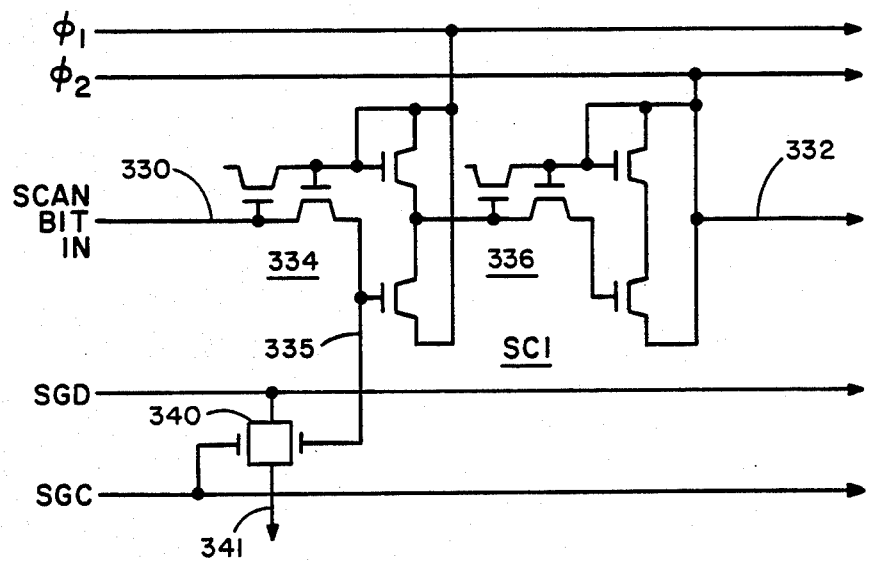
FIG. 11 is a circuit schematic showing one stage of the scan bit shift register of FIG. 7.
Figure 12:
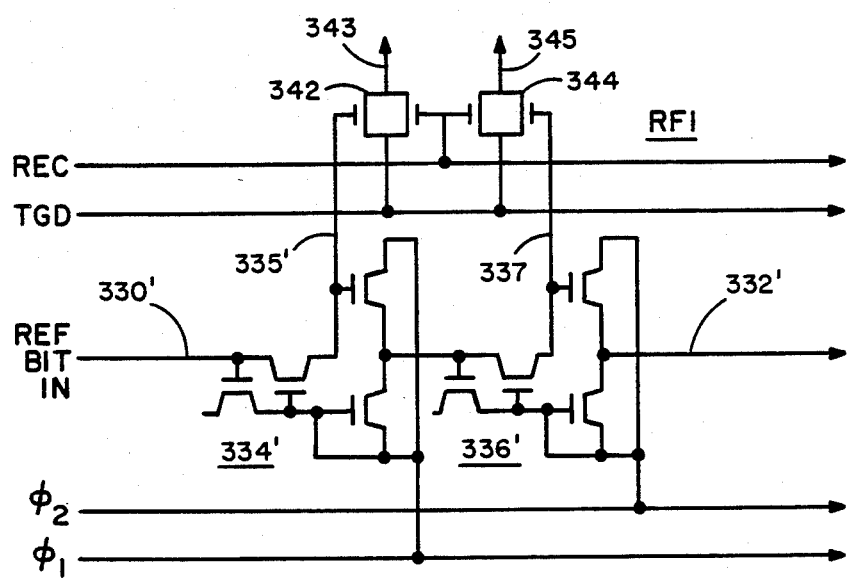
FIG. 12 is a circuit schematic showing one stage of the reference bit shift register of FIG. 7.

FIG. 11 is a schematic circuit diagram showing the circuits of the first stage SC1 of the scan bit shift register. FIG. 12 shows the first stage RF1 of the reference word shift register. The construction and operation of the two shift registers is identical. Each stage includes an input line 330 and 330', first and second stages 334, 334' and 336, 336', respectively, and an output line 332, 332'. Each register stage is made up of four field effect transistors which are driven by the timing signals $\phi 1$ and $\phi 2$. The first stage of each of the registers is controlled by $\phi 1$ and the second stage is controlled by $\phi 2$. Output lines 332 and 332' are connected to feed the information stored in the second stage to the input of the next shift register stage (SC2, RF2) in the sequences.

On the leading edge of $\phi 1$ information is transferred into the first shift register stage and becomes available to first stage output lines 335 and 335'. In the case of the scan bit register (FIG. 11) output line 335 is connected to the gate of an FET series switch 340. When a "1" bit is stored in the first stage 334, output 335 applies a negative voltage to the switch 340 and this in turn connects the scan gate of the associated correlator NI (FIG. 7) to the scan gate drive line (SGD) via a line 341. The correlator scan gate then assumes the potential of the SGD line and if SGD is in the low state the upper charge storage region in the correlator is allowed to charge to a level representing the amplitude of the analog input signal S'I. The other gate of the FET series switch 340 is connected to the SGC (scan gate clamp) line. When SGC is in its low state, the correlator scan gate is connected to the SGD line irrespective of the information stored in the first stage of shift register SC1. This clamping function is required to assure that incorrect sampling of the input signal does not occur during the computation portions of the correlator cycle.

As shown in FIG. 12, output line 335' from the initial stage of shift register RF1 is connected to a gate of FET series switch 342. The latter is used to connect the transfer gate drive line (TGD) to output line 343 which connects to a transfer gate of correlator N1 (FIG. 7). Similarly, output line 337 connects the second stage of the shift register to a gate of FET series switch 344. The latter operates to connect the TGD line with the other correlator transfer gate via line 345. Alternate control of switches 342 and 344 is provided through connection of a second pair of switch gates to the REC control line.

The REC control signal simultaneously connects both output lines 343 and 345, and thus both correlator transfer gates, to the TGD control line. When TGD turns on (goes negative—see FIG. 10), both tranfer gates are lowered and charge stored in the upper and lower charge storage regions of correlator stage N1 is permitted to be recollected at the center region. This operation is required at the beginning of each correlation cycle.

Referring now to FIGS. 7, 10, 11 and 12, operation of the correlator circuits through one correlation cycle is described. FIG. 10 shows the sequence of twelve timing control signals 0–11 for one correlator cycle. When shift pulse $\phi 1$ goes negative at the start of the cycle, the scan bit is entered into the first stage of resister SC1 and a reference bit is entered into the first stage of register RF1. At the same time SGC shifts high so that the presence of the scan bit in register SC1 is permitted to control series switch 340 (FIG. 11). Thus under the control of SGD the correlator scan gate samples analog input signal S'I and charges the upper charge storage region of N1 to a proportionate level. Thereafter, SGC shifts to its low state whereupon any further interaction of the analog input signal and the correlator charge level is inhibited.

Next, TGD shifts low and this causes the charge in the upper storage region of N1 to be shifted to the center storage region. At this point the REC control signal is in its low state so that both transfer gates of correlator N1 are connected directly to the TGD control line by switches 342 and 344 of RF1 (FIG. 12) and when TGD shifts low for the first time (FIG. 10, time interval 2) both transfer gates of the correlator are opened and the charge stored in the top storage region is shifted to the center storage region. In order for this transfer to take place, the H control signal, which drives the upper and lower reservoir electrodes of N1, must be at its higher potential and the I control signal, which drives the center reservoir electrode, must be at a more attractive negative potential. As shown in FIG. 10, the H and I signals are at the appropriate levels at this time.

As will be apparent from the following description of the bit loading and shifting sequence which occurs in the correlator circuits, no charge will have previously been stored in the lower charge storage region of N1 prior to the cycle in which an analog signal sample is loaded into the correlation stage. If charge had been previously stored in the lower region, recollection of the charge to the center region would merge the charge quantities from the upper and lower regions and thus would destroy the identity of the sample representing analog signal S'I. As will be described subsequently, the possibility of this condition is eliminated by making the first bit of the PN coded reference word a "1" which will cause the stored charge to shift to the upper storage region during the correlator cycle immediately preceding that in which a new analog signal sample is entered into the correlation stage.

After the stored charge has been recollected to the center region, control signal $\phi 2$ shifts low (FIG. 10) and this moves the data bit in registers SC1 and RF1 to the second stage. Next, the H and I control signals shift low and high, respectively, and this puts the upper and lower reservoir electrodes at the more attractive potential needed to permit the subsequent transfer of the stored charge from the center storage region to either the upper or lower region, depending on the state of the data bit stored in register RF1.

Next, REC shifts high and this turns off FET switches 303 and 305 (FIG. 7) whereupon the correlation output summing buses 302 and 304, having just been precharged to the negative level of signal H are caused to float electrically free. After this, TGD shifts low for the second time and one of the correlator transfer gates is opened, allowing the charge stored in the center storage region to transfer to either the upper or lower region, depending on which transfer gate was opened. The latter is determined by the state of information stored in shift register RF1. After the charge transfer operation is complete, TGD shifts back to its high state and the sample and hold signal S/H comes up, causing the output of differential amplifier 233 (FIG. 4a) to be sampled whereupon a correlation output signal $CI_i$ is generated. $CI_i$ represents the sum of the signals on all output lines a and b from the eight correlator circuits. Each pair of a and b outputs is generated by the source followers 307 and 309 (FIG. 7) based on the charge levels present on summing buses 302 and 304 of the respective correlator circuit. Thus correlation output signal $CI_i$ represents a 256-point cross-correlation output (assuming valid reference bits and valid signal samples are present in all 256 correlation stages).

As is apparent from the above description of one cycle of operation of correlation stage N1, the operation of all other correlation stages in the system is the same except that the sampling of the analog signal S'I and the storage of a proportional charge in the correlator stage only occurs in one correlator stage at a time. As previously described, only a single scan bit propagates through the scan bit shift register and therefore during any given single correlation cycle the loading of a new analog signal sample occurs only at one correlation stage. The stage which receives the new signal sample is the one at which the scan bit is located at that instant.

Figure 13:
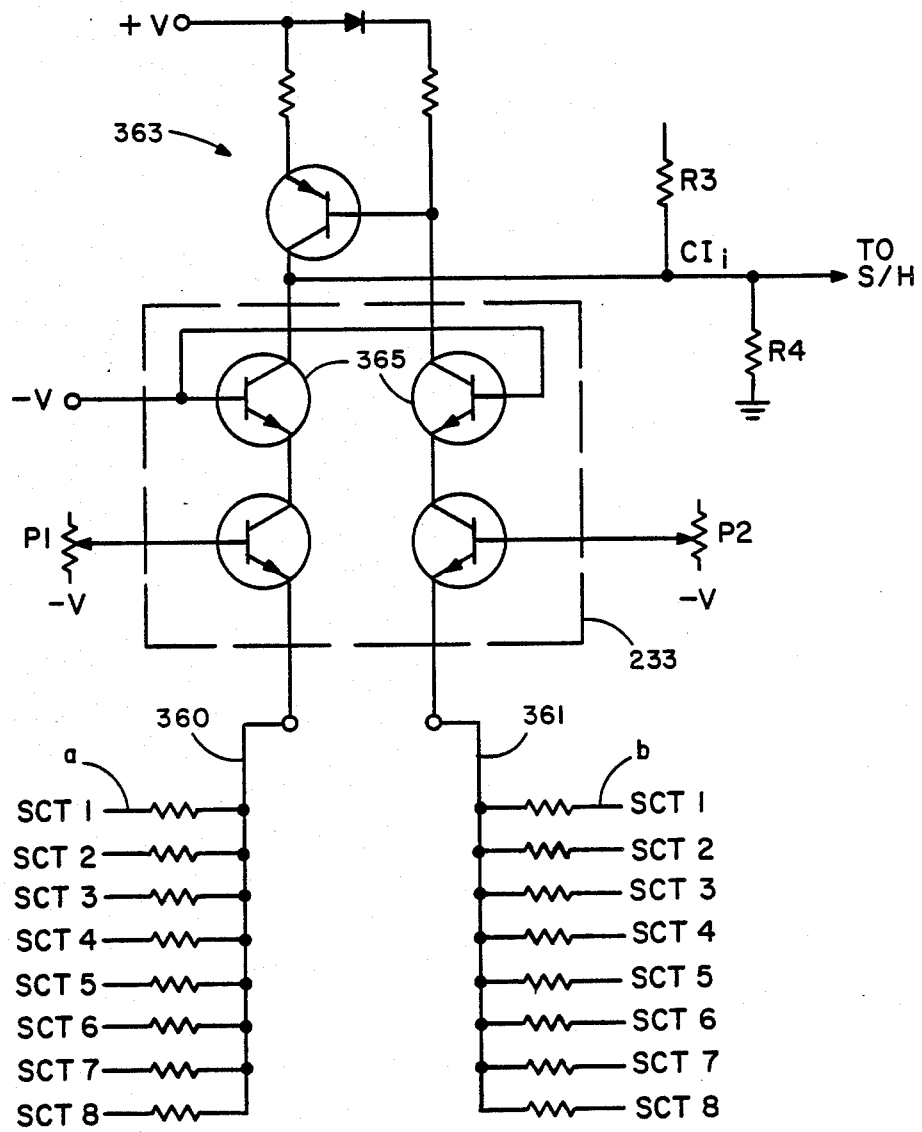
FIG. 13 is a circuit schematic showing the correlator output summing circuits and differential amplifier used with the I channel correlator circuits.

FIG. 13 shows the circuits associated with differential amplifier 233 (FIG. 4a). As shown in FIG. 13, the a output lines from all eight correlator circuits are summed on a summing bus 360 through individual summing resistors. Similarly, all b output lines from the eight correlator circuits are summed on a summing bus 361 through individual summing resistors. Lines 360 and 361 provide the inputs to differential amplifier 233. The purpose of the amplifier is to sum the inputs on both lines and develop at its output a proper voltage swing which will be applied to the analog/digital converter 112. The voltage swing at the output of the amplifier is proportional to the amount of current difference between the two inputs lines 360 and 361.

Differential amplifier 233 may, for example, include a high speed differential amplifier of the type included in an MC 1596 balanced modulator-demodulator chip. The transistor network 363 provides a source of constant current into each leg of the amplifier. The voltages at the collectors of transistor stages 365 are adjustable by varying potentiometers P1 and P2. This adjusts the voltage level at which the signals on summing buses 360 and 361 will be maintained. By adding two equal resistors R3 and R4 at the output, a nominal voltage can be developed and applied to the sample and hold input signal. Once this nominal level is set, any current variation between buses 360 and 361 will show up as a voltage drop across either R3 or R4. This drop is due to the constant current generation circuit trying to maintain equal currents in both amplifier legs. The drop will be proportional to the current variation between the input buses, thereby developing the proper voltage swing representing the correlation output signal $CI_i$.

Referring to FIG. 5, the manner in which the system operates to load the analog input signal samples and the bits of the reference word into the correlator circuits is hereinafter described. FIG. 5 depicts the loading and scanning sequence using a simplified four bit reference word R4, R5, R6 and R7. The analog signal is represented by an eight bit repeating sequence S0–S7. As shown in FIG. 5a, a four stage correlation circuit is represented and it is desired to provide a four point correlation between the R signal and the S signal. FIG. 5a depicts the case when the last bit (R7) of the reference word is loaded into the correlator first and is loaded at the same time (t=0) as the analog signal sample S0. The arrow indicates the stage into which the newest analog signal sample is loaded.

As shown three time increments later (t+3) all four bits of the reference word have been loaded in shift register fashion into the correlator and the first four samples S0–S3 of the analog signal have been loaded in a progressive rolling sequence as indicated by movement of the arrow from left to right. It is noted that in FIG. 5a the last reference bit R7 is aaintained in alignment with the newest analog signal sample (arrow) as the bits of the reference word circulate in closed-loop fashion through reference shift register. As is apparent from the drawing, at time t+7 a maximum four-point correlation is achieved.

However, FIG. 5b illustrates the case when the next-to-last bit (R6) of the reference word is loaded first and maintained in alignment with the newest analog signal sample. As shown, the maximum correlation output that can be achieved with this arrangement is the three-point match that occurs at time t+6. Similarly, looking at FIG. 5c, loading of the second bit (R5) of the reference word first results in a maximum two point correlation which occurs at time t+5. If the first bit (R4) of the reference word was loaded first and shifted through the reference shift register in alignment with the newest analog signal sample, the bits of the reference word could never be made to line up with like bits of the analog signal and no meaningful correlation output would be obtained.

Thus, as illustrated by the above examples shown in FIG. 5, it is important that in the system as shown in FIGS. 4a and 4b, the timing and control circuits operate, as previously described, to load the last bit (R256) of the reference word into the same correlator stage that the scan bit is loaded into and that the shift pulses be applied to the correlator circuits in a manner such that bit R256 is always located in the same correlator stage as the scan bit. Naturally, since the system as described is designed to perform a 256-point correlation, some small amount of misalignment between the scan bit and the last reference bit may be tolerable. However, any significant misalignment between the scan bit and bit R256 of the reference word will result in generation of a virtually meaningless and unusable correlation output.

Figure 2B:
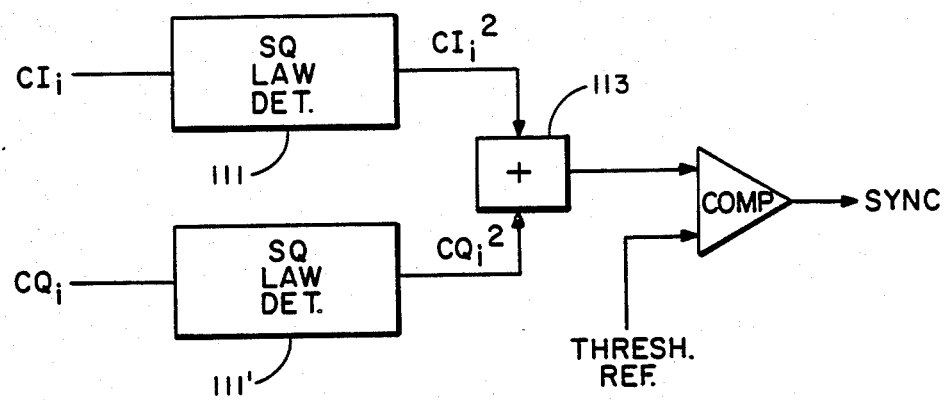

FIG. 2b shows the circuit arrangement used in the frame sync circuit 110. Correlation output signals $CI_i$ and $CQ_i$ are received from the sample and hold circuits of converters 112 and 112' by a pair of square law detectors 111 and 111'. The outputs therefrom, $CI_i^2$ and $CQ_i^2$, respectively, are summed by an adder 113 and passed to an input of comparator amplifier COMP. The latter compares the signal from adder 113 with a predetermined threshold reference level and produces the output signal SYNC when the threshold is exceeded.

Operation

With reference to FIGS. 2a, 4a, 4b and 14, operation of the system is hereinafter described.

System operation is initiated by actuation of manual reset key 280 (FIG. 4b). This resets the 5-bit address counter 252 and the cycle counter 270 (the latter being reset with a 1 at position 8 and a 0 at all other positions). During the next 32 SCLK pulses reference word W1 is loaded into the reference word shift registers in the correlator circuits 1 through 8 of both correlator subsystems 104 and 104'. The first reference word bit that is loaded into correlator 8 is R256 and simultaneously with the loading of that bit a scan bit generated by AND 260 is loaded through AND 209 and OR 221 into the first stage of the scan bit shift register of correlator 8. After the 32nd SCLK pulse, the complete 256-bit reference word has been loaded into the correlator circuits and the scan bit resides in the last (32nd) correlator stage of correlator circuit 8.

Thereafter, each $\overline{SCLK}$ pulse shifts the reference word and the scan bit one shift register position to the right. The scan bit causes a sample of baseband signal S'I to be loaded into the correlator stage in which the scan bit resides. In similar fashion samples of baseband signal S'Q are loaded into the circuits of correlator 104'.

On each ensuing $\overline{SCLK}$ pulse a new sample of signal S'I and S'Q is loaded into the next correlator stage in sequence and the correlation output signals $CI_i$ and $CQ_i$ are generated representing separate 256-point correlations between the reference word and the analog signal samples then stored in the 256 correlation stages of each correlator. The output signals $CI_i$ and $CQ_i$ are sampled and held in the S/H circuit of converters 112 and 112' and the level of the signal is monitored by frame sync detection circuit 110 (FIG. 4a). $CI_i$ and $CQ_i$ are composed of a continuous sequence of sampled signal levels successively appearing at the outputs of the sample and hold circuits. When the combined level of any given sample of $CI_i$ and $CQ_i$ exceeds a predetermined threshold, frame sync circuit 110 generates a SYNC pulse indicating that a correlation match exists between the received signal and the reference signal.

Figure 14:
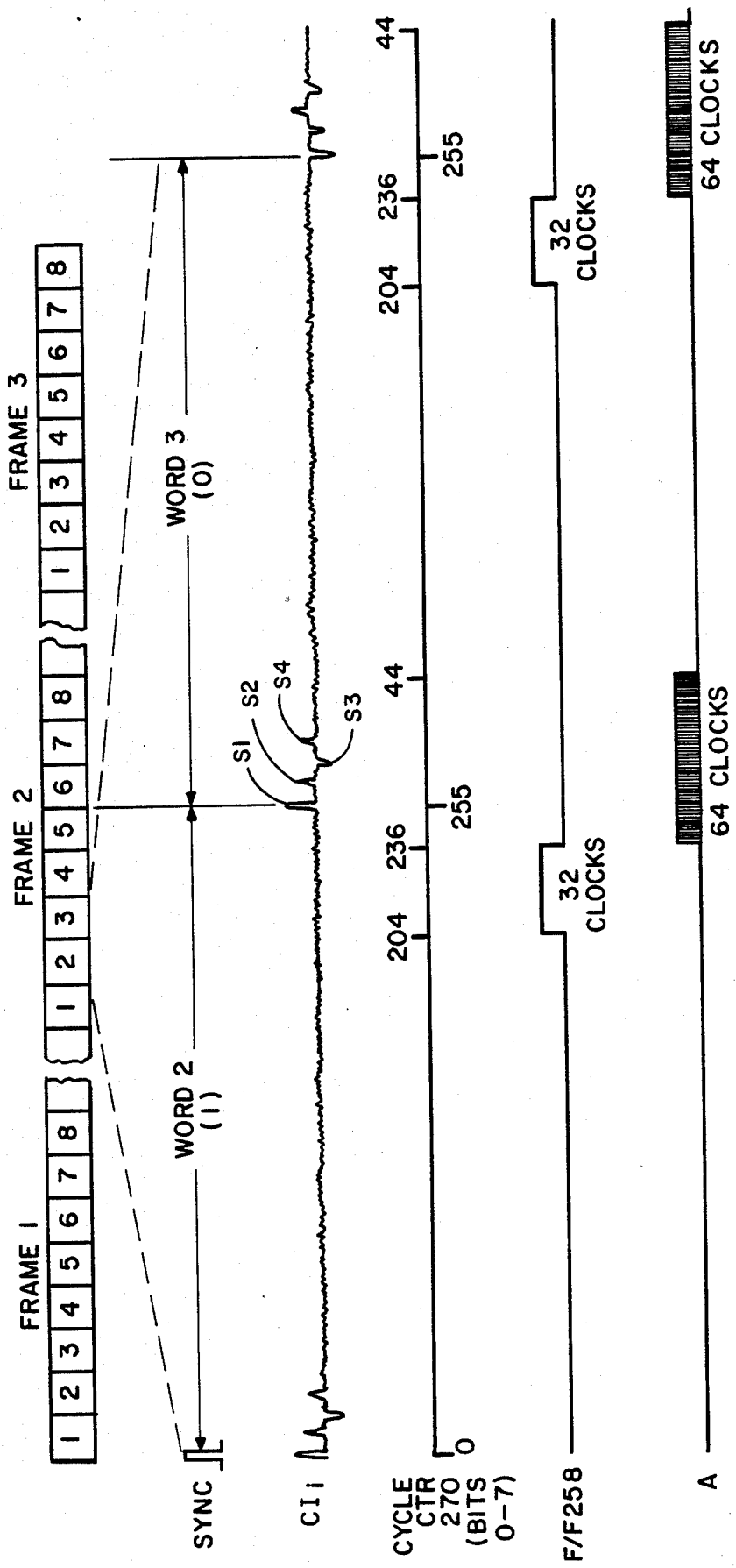
FIG. 14 is a timing diagram illustrating the system operation of the I channel of the principal embodiment of the invention.

The SYNC pulse sets flip-flop 276 (FIG. 4b) and initiates operation of the timing and control circuits 108. Cycle counter 270 (FIG. 4b) begins incrementing and the sequence of events depicted in FIG. 14 commences. As shown in FIG. 14, when cycle counter 270 reaches a count of 204 flip-flop 258 is set and initiates a 32 clock pulse sequence wherein address counter 252 causes the loading of reference word W2 into the reference word shift registers of the correlator circuits. As was the case with reference word W1, a scan bit is loaded into the scan bit register of correlator circuit 8 of correlators 104 and 104' at the same time that reference word bit R256 is loaded into the reference word shift register of both correlator circuits. As the reference word and scan bits are circulated through their respective shift registers, reference bit R256 stays in alignment with the scan bit.

After the thirty-two clock pulse load sequence, when cycle counter 270 reaches a count of 236, AND 298 is enabled by flip-flops 292 and 294 and control signal A is initiated. This signal stays up for the next 64 clock pulses until the first eight positions of cycle counter 270 recycle to a count of 44 (FIG. 14). Control signal A conditions AND 235 (FIG. 4a) so that the 64 $CI_i$ and $CQ_i$ signals occurring during the time interval of signal A are converted to 8-bit digital bytes by the analog/digital converters 112 and 112'. As shown in FIG. 14, the sampling window defined by control signal A spans a period of time when the main signal component S1 and all multipath signal components S2, S3 and S4 arrive at the receiver. Since the data words within a frame are spaced at 256 clock pulse intervals (the period of timing signal SCLK is set to be substantially identical to the period of the timing signal used in the transmitter), it is assumed that data words 2 through 8 will occur at 256 clock pulse intervals from the SYNC signal. However, because the latter signal might have been triggered by detection of a multipath component rather than the main signal component, control signal A is brought positive approximately 20 clock pulses prior to termination of the first 256 clock pulse interval following SYNC so that any earlier signal components of word 2 will be detected. The width of the sampling interval defined by control signal A is set so that the most delayed multipath component that can be expected will be included within the sampling window.

The 64 correlation output signal samples of $CI_i$ and $CQ_i$ that are generated by analog/digital converters 112 and 112' during sampling interval A are fed to the adaptive filter circuits and processed by multipliers 128 and 128' (FIG. 2a), which multiply each successive $CI_i$ and $CQ_i$ signal sample by the smoothed correlation function signal $FI_i$ and $FQ_i$ respectively. The signals $FI_i$ and $FQ_i$ are 64 byte smoothed correlation function signals compiled by processing the 64 bytes of the $CI_{i-1}$ and $CQ_{i-1}$ signals and the 64 bytes of the $FI_{i-1}$ and $FQ_{i-1}$ signals which are stored in the pair of 64-stage shift registers of each adaptive filter 115 and 115'.

Figure 15A:
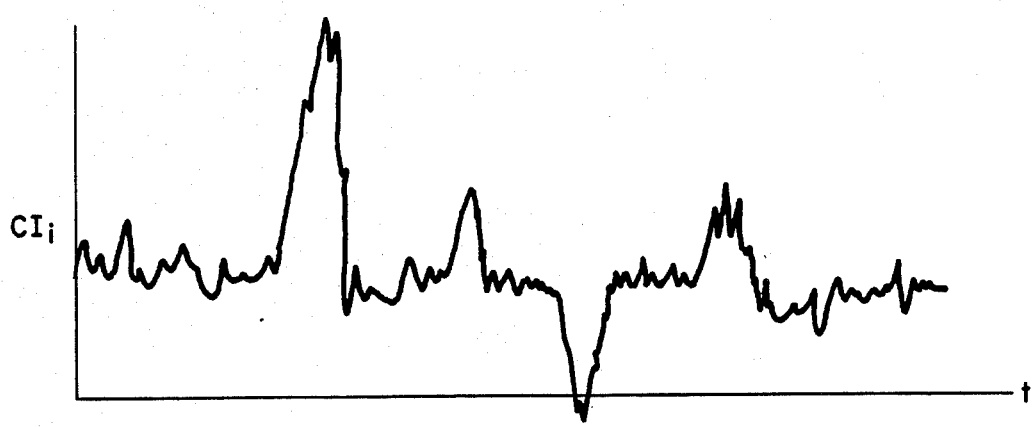
FIGS. 15a, 15b, and 15c are waveform diagrams comparing the raw correlation output signals $CI_i$ and $CI_{i+1}$ to the smoothed correlation signal $FI_i$.
Figure 15B:
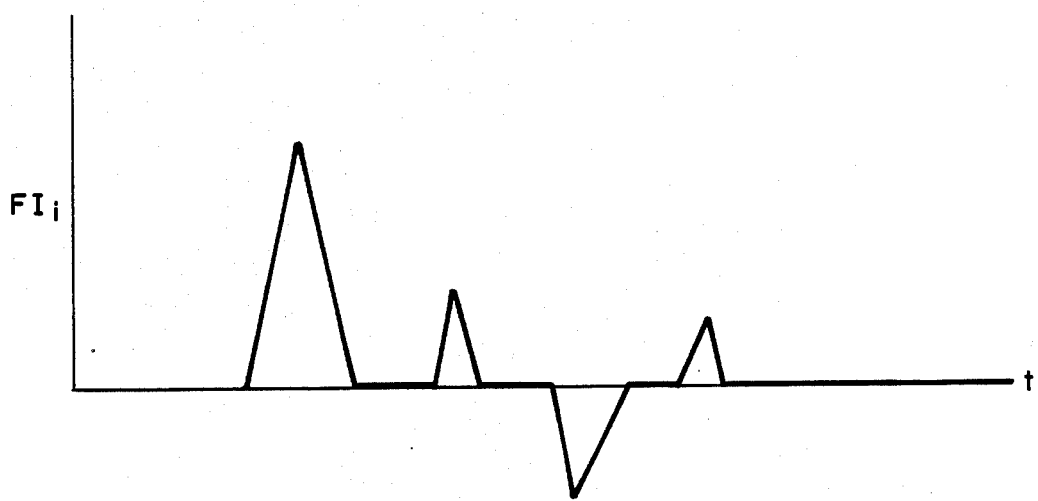

FIGS. 15a and 15b show a respresentative comparison between the 64 bytes of signal $CI_i$ and the corresponding bytes of signal $FI_i$. The latter signal is compiled over many word detection intervals and provides an accurate estimation of the characteristics of the signal propagation environment which has been encountered by the system during the preceding several data frames. By multiplying the most recent correlation output signals $CI_i$ by $FI_i$, valid correlation outputs in the former are greatly enhanced and noise spikes occurring between the correlation spikes $CI_i$ are suppressed. As shown in FIG. 15a, the negative-going correlation spike actually represents phase reversal of the signal due to the environment and it does not represent a $-1$ correlation. Multiplication of $CI_i$ by $FI_i$ reverses the polarity of the negative-going spike such that all modified correlation output signals generated by multiplier 128 are of positive polarity.

Figure 15C:
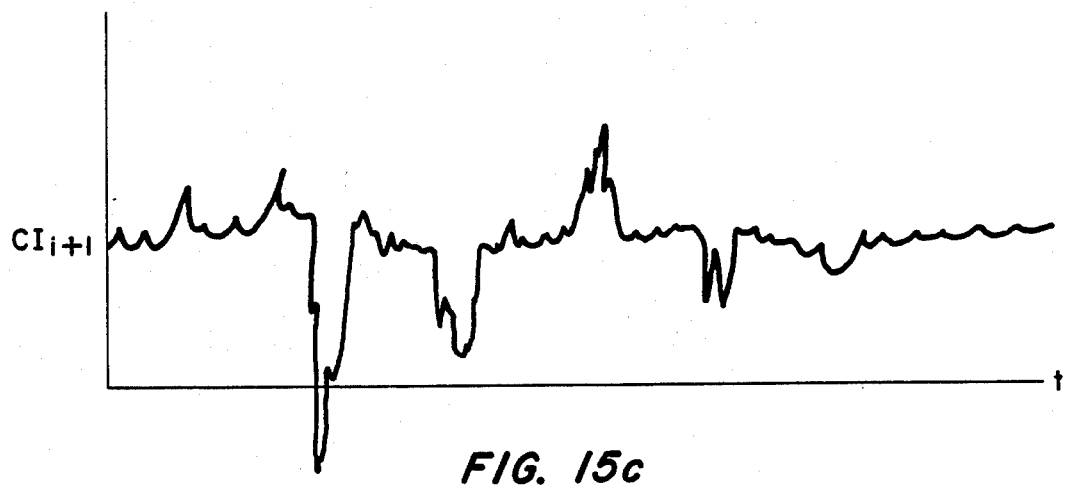

If the correlation output $CI_{i+1}$ generated during the next data word interval represents a $-1$ modulation (binary 0) it will appear as shown in FIG. 15c. When it is multiplied by the smoothed correlation function signal $FI_{i+1}$ (which will not be appreciably different from $F_i$) the polarity of all modified correlation output signals is negative. Thus, the characteristics of the smoothed correlation signal represent only the conditions of the multipath environment and do not incorporate the message content of the transmitted signal. This is achieved by use of the decision directed feedback on line 139 (FIG. 2a) which selectively reverses the states of adder-subtractors 120 and 124 in the adaptive filter in accordance with the polarity ($+1$ or $-1$) of each detected data word.

Cycle counter 270 (FIG. 4b) causes the above described sequence of events to reoccur for each of data words 2 through 7. The 64 modified $CI_i$ and $CQ_i$ bytes processed by and gated out of multipliers 128 and 128' during each word detection interval are summed and fed to accumulator 132. At the end of the sampling interval A, single-shot 136 (FIG. 2a) produces a pulse which opens gate 134a, gating the output of detector circuit 130 to output line 138 and feedback line 139. Detector circuit 134 generates an output indicative of a binary one if the value in accumulator 132 exceeds zero. Conversely, detector 134 generates an output indicative of a binary 0 if the value in accumulator 132 is less than zero.

After the eighth word of the data frame has been read out in the above described manner, cycle counter 270 (FIG. 4b) reaches the condition where a 1 output appears in the 11th counter position. This conditions AND 296 and causes flip-flop 294 to be reset the next time the 0–7 stages of counter 270 cycle to a count of 44. Resetting of flip-flop 294 prevents control signal A from coming up again during that data frame and no further data output signals will appear on line 138 (FIG. 2). When decode circuit 272 (FIG. 4b) indicates that it is time for the next data frame to occur, single-shot 278 will again be actuated and another frame detection cycle, similar to that described above, will be initiated. Decode circuit 272 is set so that it will actuate single-shot 278 fifty-two SCLK pulses prior to the time that the first bit of the next W1 signal is received. This assures that word 1 will be detected on the basis of a full 256 samples of the input signal and that the scan bit will be properly synced for detection of words 2 through 8.

Modified Embodiment

Figure 16:
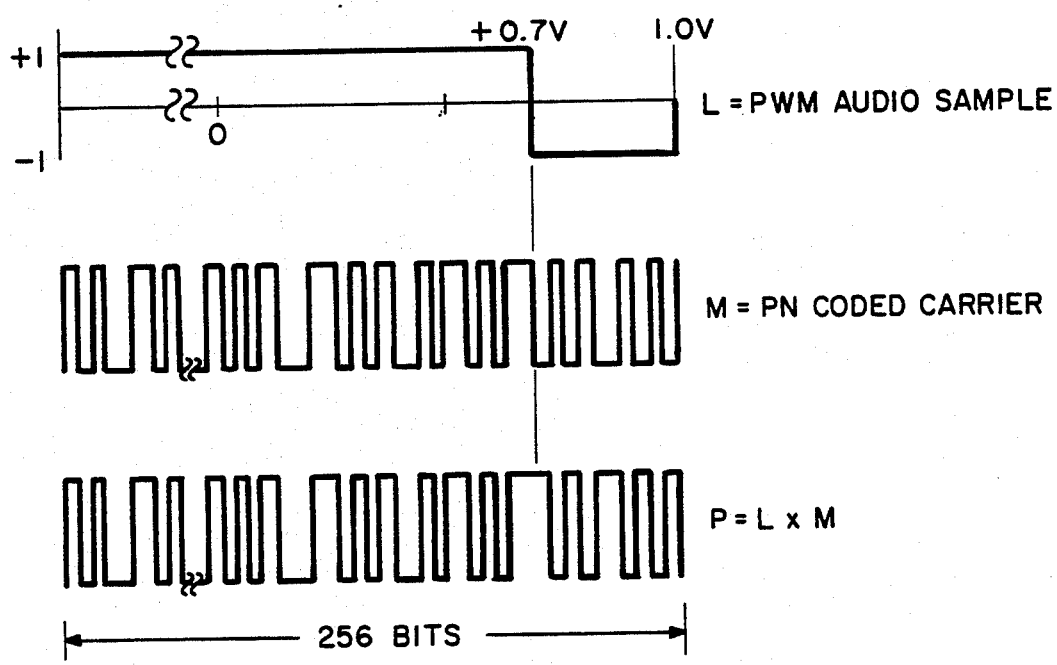
FIG. 16 is a waveform diagram illustrating the manner in which PWM audio signal samples are impressed on a PN coded carrier for transmission and decoding in connection with an alternative embodiment of the invention.
Figure 17:
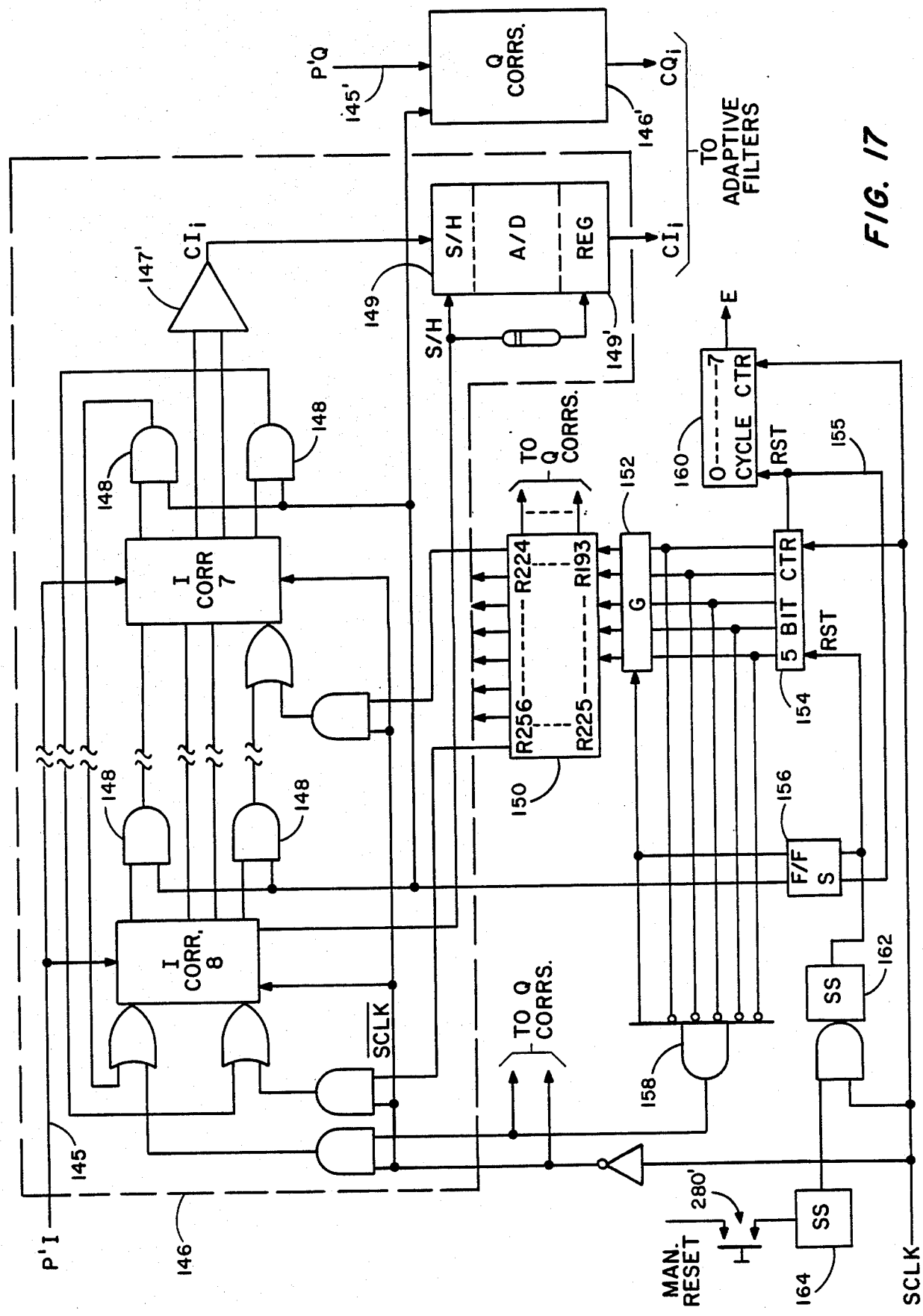
FIG. 17 is a block diagram showing the correlator circuits and the basic timing and control circuits used in connection with the audio embodiment of the invention.
Figure 18:
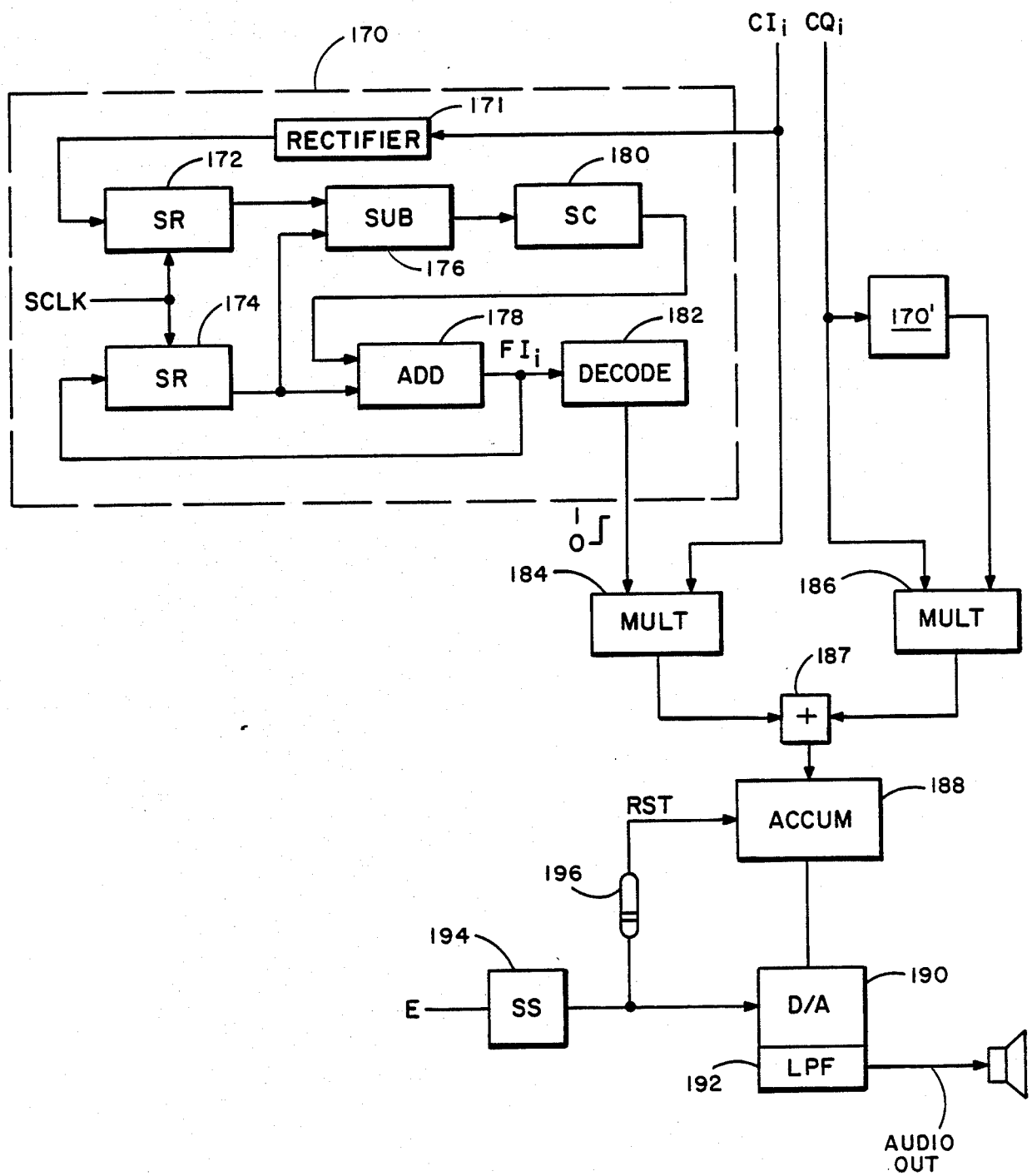
FIG. 18 is a schematic circuit diagram showing the adaptive filter arrangement used with the audio embodiment of the invention.

FIGS. 16, 17 and 18 illustrate a modified form of the above-described baseband system wherein the receiver processes audio signals transmitted from a plurality of stationary independent transmitters located at different distances from a stationary receiver. The principal of operation for the audio system is essentially the same as that described above for the digital data transmission system and the description provided hereinafter highlights only the essential differences between the two systems.

As shown in FIG. 16, audio signals transmitted from each of the transmitters are encoded in accordance with a pulse width modulation (PWM) technique and impressed on a PN coded carrier signal which may, for example, comprise the same 256-bit PN code sequence discussed previously. The PWM audio signal L is generated by sampling the audio input at a frequency which is the reciprocal of the 256-bit period (basic word interval) of the PN coded carrier signal M. Signal L defines the amplitude of the audio signal sample in terms of the relative time within the basic word interval that the signal L switches from a +1 level to a −1 level. The signal L may be generated, for example, by sampling the audio input with a sample and hold circuit and feeding an output therefrom to one input of a differential amplifier. The other input of the differential amplifier may be generated by a ramp circuit which produces a ramp voltage starting a −1 volt and increasing at a constant rate up to +1 volt over the time period of the basic word interval. The output of the differential amplifier will switch when the ramp input voltage rises to a level equalling the sampled audio signal. A polarity detection circuit connected to the output of the differential amplifier produces the signal L.

The signal L is multiplied by the PN coded carrier signal M and the result is a baseband signal P (FIG. 16) which exhibits a phase reversal coincident with the transition of signal L from +1 to −1.

Signals from several transmitters using the same PN coded carrier modulated as described above can be simultaneously detected through use of a correlation receiver constructed as shown in FIGS. 17 and 18. The former figure illustrates the basic correlator circuits, timing and control circuits and PN generator of the receiver while FIG. 18 illustrates the adaptive filter arrangement utilized. The received rf signal is synchronously demodulated as in the system of FIG. 2a by an IF converter and a synchronous detector whereby two orthogonal baseband signals P'I and P'Q are generated and presented on lines 145 and 145' (FIG. 17).

Line 145 couples P'I in parallel to eight sequentially connected 32-stage correlator circuits arranged in the same manner as described for the previous embodiment. The P'Q signal is processed by an identical correlator subsystem 146'. The correlator circuits continuously circulate the 256 bits of the PN-coded reference word together with a single scan bit. The reference word duplicates the bit sequence of the PN coded carrier used at the transmitters. As in the previous embodiment, the scan bit is maintained in alignment with the last bit (R256) of the reference word. As before, the scan bit and the reference bits circulate through the correlator circuits from left to right, shifting one stage for each $\overline{SCLK}$ pulse During each $\overline{SCLK}$ pulse a signal S/H generated by the timing circuits in correlator circuit 8 actuates the analog/digital converter circuit 149 whereupon the correlation output signal CI$_i$ appearing at the output of differential amplifier 147 is converted to a digital byte and stored in register 149'. The Q channel correlator circuits 146' function in the same manner to generate a correlation output CQ$_i$.

The bits of the reference word are loaded into the correlator circuits by a PN code generator circuit including a read only memory 150, 5 bit address counter 154, gate circuit 152, flip-flop 156 and single-shots 162 and 164. Actuation of manual reset key 280' activates single-shots 164 and 162 whereupon address counter 154 is reset to an all-zero state and flip-flop 156 is reset. This opens gate circuit 152 and deconditions AND gates 148 connected to the scan bit and reference word shift register outputs of the correlator circuits.

During the next 32 SCLK pulses, the 256 bits of the reference word are loaded into the reference word shift registers of the correlator circuits. As with the previously described embodiment, a scan bit is generated by AND 158 and loaded into the scan bit shift register of correlator 8 of both correlator subsystems 146 and 146' at the same time that reference bit R256 is entered into the reference word shift register of correlator 8. After the reference word had been loaded, a carry signal is presented on output line 155 from address counter 154 which sets flip-flop 156 and resets cycle counter 160 to an all-zero state. Setting of flip-flop 156 closes gate 152 and thus terminates and ROM readout and reference word load operation. Also, AND gates 148 are conditioned so that the scan bit and the reference word bits can circulate freely through the correlator shift registers. Cycle counter 160 is an eight position counter which produces an output signal E after each 256 SCLK pulses.

After the reference word has been loaded and cycle counter 160 is reset, the system cycles through a continuous repetitive sequence of 256-point correlations between the reference word and the samples of analog signals P'I and P'Q which are stored in the correlator circuits. On completion of the correlation cycle performed during each $\overline{SCLK}$ pulse, the correlation output signals CI$_i$ and CQ$_i$ appearing at the output of differential amplifier 147 and its counterpart in Q channel circuits 146' are sampled and converted to digital bytes in the analog/digital converters FIG. 18 shows the adaptive filter and output circuits which generate the audio output signal from the continuous sequence of correlation outputs CI$_i$ and CQ$_i$. As in the previously described embodiment, a pair of multipliers 184 and 186 multiply each successive correlation output byte by a corresponding output from the circuits 170 and 170'. However, in the present embodiment, the filter signals, such as FI$_i$, control decode circuits (shown as 182 for the I channel circuit 170) which pass either a 1 or a 0 signal to the multipliers depending upon the value of FI$_i$ and FQ$_i$. In other words, multipliers 184 and 186 simply operate as gates to pass CI$_i$ and CQ$_i$ bytes to accumulator 188. Prior to entry into the accumulators the correlation outputs are summed by an adder 187.

The I channel adaptive filter shown in FIG. 18 includes, in addition to decode circuit 182 and multiplier circuit 184, a pair of 256-stage shift registers 172 and 174, a subtraction circuit 176, a scaler circuit 180 and an adder circuit 178. Shift register 172 stores 256 bytes making up the CI$_{i-1}$ signal generated during the preceding word interval. Shift register 174 stores the 256 bytes of the signal FI$_{i-1}$ representing the smoothed correlation function generated during the preceding word interval. As each correlation output signal CI$_i$ is presented to multiplier 184, decode circuit 182 either gates it through to accumulator 188 or not, depending on the level of the FI$_i$ byte which is presented at that instant to the decode circuit. The smoothed correlation function FI$_i$ functions to record the time sequence in which valid correlation outputs can be expected to occur during the successive word intervals. Each correlation output occurs at a time within the basic word interval that is dependent on the distance from the receiver of the transmitter that generated the signal corresponding to that particular correlation output.

A rectifier circuit 171 is provided at the input to shift register 172 for converting each negative-level $CI_i$ signal to a positive signal of equal amplitude. This assures that a significant $FI_i$ signal will build up and will not be diminished by the bipolar fluctuations of the $CI_i$ values which occur due to the modulation technique used.

As a result of the technique used to impress the audio signal samples on the PN coded carrier (per the description given in connection with FIG. 16), the amplitude of each correlation output signal $CI_i$ represents the amplitude of the corresponding audio sample. That is, if the value of an audio sample is 0 volts (no signal), the correlation circuit will detect 128 positive $(+1)$ correlations and 128 negative $(-1)$ correlations during the word interval representing that audio sample. This is because the signal L (FIG. 16) switches from $+1$ to $-1$ exactly half way through the word interval and the signal P for that interval has half of its bits exactly in alignment with the PN reference ($+1$ correlation) and half of its bit exactly out of alignment ($-1$ correlation). The correlation output $CI_i$ for that word interval will be zero. Thus, when decode circuit 182 (FIG. 18) switches on multiplier 184 to process that particular correlation output, the output of multiplier 184 will be zero. The reason that decode circuit 182 operates to turn multiplier 184 on even though the $CI_i$ output is zero at that instant is because $FI_i$ at that particular instant of time will be at some significant level caused by the fact that significant audio outputs from that particular transmission source had been received in the immediate past.

The Q channel adaptive filter 170' operates to control multiplier 186 to process the Q channel output signal $CQ_i$ in exactly the same fashion.

Correlation outputs representing valid audio signals are summed by adder 187 and accumulated in accumulator 188 during each word interval and at the end of the word interval control signal E actuates single-shot 194. The latter causes digital/analog converter 190 to convert the sum stored in accumulator 188 to an analog level which is then passed through a low pass filter 192 and presented as an audio output signal. After each accumulator readout operation a delay circuit 196 presents a reset signal to accumulator 188 to restore it to a predetermined reference state (such as zero) in preparation for the next word interval.

Thus, all correlation output signals which are received during a given word interval are summed (integrated) in accumulator 188. Even though correlation outputs representing audio samples from different transmitters are detected at different times at the receiver, accumulator 188 realigns the signals so that they are presented to the audio output channel as though they occurred at the same instant in time.

This gives the same effect as mixing a plurality of independent audio input signals into a common channel and outputting them through a single speaker. It is noted that some of the correlation outputs gated through multipliers 184 and 186 during a word detection interval may represent multipath replications of an audio signal as well as the main signal components thereof. The system employing the accumulator 188 as described above thus resolves the multipath problem in the same way as the previously described data transmission embodiment.

SUMMARY

As illustrated by the above embodiments, a system has been provided wherein a rapid succession of simultaneously computed N-bit correlations are performed between the input baseband signal and a binary coded psuedo-noise reference signal. The repetition rate of the sequential correlation operations may be made sufficiently high to enable resolution of all multi-path components of the received signal. This enables recombination at the receiver of the main signal component with its multipath replications with the result that signal processing gain is greatly increased over that for known practical correlation receiver sytems. A system has been built in accordance with the principals of the present invention and operated at a 1 MHz. frequency (SCLK=1 megahertz). Use of the PN coded carrier permits spread spectrum operation and consequently allows the communication system to operate in the presence of large amounts of noise and/or interfering signals. At the same time use of the PN coded carrier makes the transmitted signal very difficult to intercept. Also, because of the wideband nature of the transmitted signal the system can operate without interfering with conventional narrowband communication channels in the same frequency band since to narrowband receivers the PN coded signal appears as noise and is rejected by conventional noise filters.

It will be appreciated that various additional changes in the form and details of the above described embodiments may be effected by persons of ordinary skill without departing from the true spirit and scope of the invention.

I claim:

1. In a spread spectrum communication system, a receiver for decoding a binary data signal transmitted on a pseudo-noise (PN) coded carrier, comprising, in combination:
   correlation means for performing an N-point correlation of said data signal against a reference signal representing said PN coded carrier by simultaneously comparing the amplitude of N samples of said data signal with N samples of said reference signal;
   means for controlling said correlation means to serially perform a plurality of said correlations during each of a series of sampling intervals when a high correlation output is likely to occur;
   an adaptive filter for processing the correlation outputs generated during each of said sampling intervals, said filter including first signal storage means, second signal storage means for storing the correlation outputs from the last preceding sampling interval, means for combining the signals stored in said first and second signal storage means to derive a control signal representing a smoothed correlation function in accordance with the expression $F_i = F_{i-1} + d_{i-1}K(C_{i-1} - d_{i-1}F_{i-1})$ where $F_i$ represents the smoothed correlation function and $F_{i-1}$, $C_{i-1}$ and $d_{i-1}$ represent, respectively, the smoothed correlation function, correlation output and decoded binary data output derived during the preceding sampling interval, means for multiplying said correlation outputs by said control signal to produce a filtered correlation output signal, and means for transferring said control signal to said first signal storage means;

means for integrating said filtered correlation output signal over the period of said sampling interval; and detection means for generating a decoded binary output signal in accordance with the value of said integrated output signal.

2. The system set forth in claim 1 wherein said means for combining the signals stored in said first and second signal storage means comprises:

a first adder-subtractor connected to receive the signals from said first and second storage means and operable to generate a first sum/difference output signal;

a scaling circuit for multiplying said first sum/difference output signal by a scaling constant;

a second adder-subtractor connected to receive the signal from said first storage means and from said scaling circuit and operable to generate a second sum/difference output signal representing said control signal; and means for selectively switching said first adder-subtractor into a predetermined add/subtract state and for switching said second adder/subtractor into the opposite state in response to the output from said detection means.

3. The system set forth in claim 2 further comprising a deadband circuit connected to the output of said second adder-subtractor for passing said control signal to said multiplying means when said control signal exceeds a predetermined threshold level and for passing a zero level signal to said multiplying means when said control signal does not exceed said threshold level.

4. A system for correlating an input signal against an N-bit reference signal, said system comprising, in combination:

N correlation circuits, each said circuit having first storage means for storing a sample of said input signal, second storage means for storing a bit of said reference signal and means for providing a correlation output, said second storage means being serially interconnected so that said correlation circuits are arranged in an N-stage sequence;

scan means for serially loading samples of said input signal into said first storage means, said scan means operating to load said storage means in order according to said N-stage sequence;

loading means for entering the bits of said reference signal into said second storage means; and control means for serially shifting the bits of said reference signal through said second storage means in synchronism with the loading of said input signal samples, the sequence of said reference signal bits being arranged such that the last bit is kept in alignment with the newest sample of said input signal and the first bit is kept in alignment with the oldest stored sample of said input signal.

5. In a spread spectrum communication system including a plurality of transmitters operating to transmit independent audio signals impressed on a pseudo-noise (PN) carrier signal, a receiver comprising in combination:

correlation means for receiving a composite of said audio signals and for performing a continuous sequence of N-point correlations on said composite signal against a reference signal representing N bits of said PN carrier signal;

accumulation means for storing the sum of the outputs generated by said correlation means;

control means for resetting the level stored in said accumulation means to a predetermined reference value after each N correlation operations; and output means operable prior to each said resetting operation for feeding the output of said accumulation means into an audio output channel to generate an audio signal representing a composite of said transmitted signals.

6. In an rf communication system, a receiver which provides detection of all multipath components of a signal transmitted in rf form on a pseudo-noise (PN) carrier, said detection being provided independent of phase differences that exist between said components, said receiver comprising:

synchronous demodulation means for converting the received rf signal into I and Q signal components representing baseband demodulations of said signal at orthogonally related phase-detection angles;

I correlation means for performing an N-point correlation of said I signal component against a reference signal representing said PN coded carrier;

Q correlation means for performing an N-point correlation of said Q signal component against a reference signal representing said PN coded carrier;

means for controlling said I and Q correlation means to serially perform a plurality of said correlations during a sample interval when a high correlation output is likely to occur;

means for accumulating the outputs from said correlations;

means for generating a decoded output signal in accordance with the sum of said accumulated correlation outputs; and a pair of adaptive filter circuits for processing the outputs from said I and Q correlations prior to the presentation thereof to said accumulating means, each said filter circuit including means for multiplying its respective correlation output by a signal function representing an estimation of said correlation output over the duration of said sampling interval.

7. In a communication system, a receiver for decoding an information signal transmitted on a psuedo-noise (PN) coded carrier comprising, in combination:

correlation means for performing an N-point correlation of said received signal against a reference signal representing said PN coded carrier by simultaneously comparing the amplitude of N samples of said received signal with N samples of said reference signal;

means for controlling said correlation means to serially perform a plurality of said correlations during a sampling interval when a high correlation output is likely to occur;

means for accumulating the output from said correlations;

means for generating a decoded output signal in accordance with the sum of said accumulated correlation outputs; and an adaptive filter for processing said correlation outputs prior to the presentation thereof to said accumulating means, said filter comprising means for developing a smoothed correlation function including first signal storage means, second signal storage means for storing the correlation outputs from the last preceding sampling interval, means for combining the signals stored in said first and second signal storage means in accordance with a predetermined filtering function to derive a control signal representing said smoothed correlation function, means for multiplying said correlation outputs by said control signal, and means for transferring the latter for said first signal storage means.

8. In a communication system, a receiver for decoding an information signal transmitted on a psuedo-noise (PN) coded carrier compring, in combination:

correlation means for performing an N-point correlation of said received signal against a reference signal representing said PN coded carrier by simultaneously comparing the amplitude of N samples of said received signal with N samples of said reference signal;

means for controlling said correlation means to serially perform a plurality of said correlation during a sampling interval when a high correlation output is likely to occur, said controlling means further includes synchronization means for controlling said correlation means to perform a continuous sequence of said N-point correlations; cycle timing means; and means responsive to a correlation output of a predetermined level generated during said continuous sequence of correlations for causing said cycle timing means to generate a series of clock signals for timing said sampling interval;

means for accumulating the outputs from said correlations; and means for generating a decoded output signal in accordance with the sum of said accumulated correlation outputs.

* * * * *